(12) United States Patent
Lee et al.

(10) Patent No.: US 10,055,807 B2
(45) Date of Patent: Aug. 21, 2018

(54) HARDWARE ARCHITECTURE FOR ACCELERATION OF COMPUTER VISION AND IMAGING PROCESSING

(71) Applicant: Samsung Electronics Co., Ltd, Suwon-si (KR)

(72) Inventors: Seungjin Lee, Santa Clara, CA (US); Seok-Jun Lee, Allen, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 79 days.

(21) Appl. No.: 15/059,175

(22) Filed: Mar. 2, 2016

(65) Prior Publication Data
US 2017/0256016 A1    Sep. 7, 2017

(51) Int. Cl.
*G06T 1/60*       (2006.01)
*G06T 1/20*       (2006.01)
*G09G 5/36*       (2006.01)

(52) U.S. Cl.
CPC . *G06T 1/20* (2013.01); *G06T 1/60* (2013.01)

(58) Field of Classification Search
CPC .............. G06T 1/60; G06T 1/20; G09G 5/363
USPC .................................. 345/502, 503
See application file for complete search history.

(56) References Cited

U.S. PATENT DOCUMENTS

| | | | | |
|---|---|---|---|---|
| 6,253,291 B1 * | 6/2001 | Pong | .................... | G06F 12/0811 711/146 |
| 6,347,344 B1 * | 2/2002 | Baker | .................... | G06F 13/102 345/501 |
| 7,636,817 B1 | 12/2009 | Pritchard | | |
| 7,698,521 B2 | 4/2010 | Watanabe | | |
| 8,063,907 B2 | 11/2011 | Lippincott et al. | | |
| 8,194,753 B2 | 6/2012 | Lee | | |
| 8,234,423 B2 | 7/2012 | Liu et al. | | |
| 8,442,388 B1 | 5/2013 | Panje | | |

(Continued)

FOREIGN PATENT DOCUMENTS

| | | |
|---|---|---|
| JP | 2011520166 A | 7/2011 |
| KR | 20070119692 A | 12/2007 |

OTHER PUBLICATIONS

Foreign Communication From a Related Counterpart Application, PCT Application No. PCT/KR2017/001028, International Search Report dated Apr. 25, 2017, 4 pages.

(Continued)

*Primary Examiner* — Zhengxi Liu
*Assistant Examiner* — Yi Yang

(57) ABSTRACT

An image and vision processing architecture included a plurality of image processing hardware accelerators each configured to perform a different one of a plurality of image processing operations on image data. A multi-port memory shared by the hardware accelerators stores the image data and is configurably coupled by a sparse crossbar interconnect to one or more of the hardware accelerators depending on a use case employed. The interconnect processes accesses of the image data by the hardware accelerators. Two or more of the hardware accelerators are chained to operate in sequence in a first order for a first use case, and at least one of the hardware accelerators is set to operate for a second use case. Portions of the memory are allocated to the hardware accelerators based on the use case employed, with an allocated portion of the memory configured as a circular buffer.

22 Claims, 33 Drawing Sheets

(56) References Cited

U.S. PATENT DOCUMENTS

| | | | |
|---|---|---|---|
| 8,555,035 B1* | 10/2013 | Patney | G06F 8/441 |
| | | | 712/216 |
| 8,625,677 B2 | 1/2014 | Lee | |
| 8,675,730 B2 | 3/2014 | Garg et al. | |
| 8,705,632 B2 | 4/2014 | Vannerson et al. | |
| 8,948,262 B2 | 2/2015 | Raveendran et al. | |
| 8,949,838 B2 | 2/2015 | Mital et al. | |
| 9,098,491 B2 | 8/2015 | Gu et al. | |
| 2006/0020719 A1* | 1/2006 | Martinez | G06F 13/28 |
| | | | 710/22 |
| 2006/0106978 A1* | 5/2006 | Moore | G01N 15/14 |
| | | | 711/110 |
| 2008/0043276 A1* | 2/2008 | Escott | G06F 5/14 |
| | | | 358/1.15 |
| 2009/0043948 A1 | 2/2009 | Wittenburg et al. | |
| 2009/0248920 A1 | 10/2009 | Chaudhuri et al. | |
| 2010/0063825 A1 | 3/2010 | Williams et al. | |
| 2011/0022818 A1 | 1/2011 | Kegel et al. | |
| 2011/0080404 A1* | 4/2011 | Rhoades | G06T 15/005 |
| | | | 345/423 |
| 2011/0280314 A1 | 11/2011 | Sankaran et al. | |
| 2014/0007098 A1 | 1/2014 | Stillwell, Jr. et al. | |
| 2014/0240327 A1* | 8/2014 | Lustig | G06F 9/52 |
| | | | 345/505 |
| 2015/0046677 A1 | 2/2015 | Moloney et al. | |
| 2015/0206269 A1 | 7/2015 | Qin et al. | |
| 2015/0235341 A1* | 8/2015 | Mei | G06T 1/60 |
| | | | 345/426 |
| 2015/0317190 A1 | 11/2015 | Ebcioglu et al. | |
| 2015/0332495 A1* | 11/2015 | Liao | G06T 15/005 |
| | | | 345/501 |

OTHER PUBLICATIONS

Foreign Communication From a Related Counterpart Application, PCT Application No. PCT/KR2017/001028, Written Opinion dated Apr. 25. 2017. 7 pages.

* cited by examiner

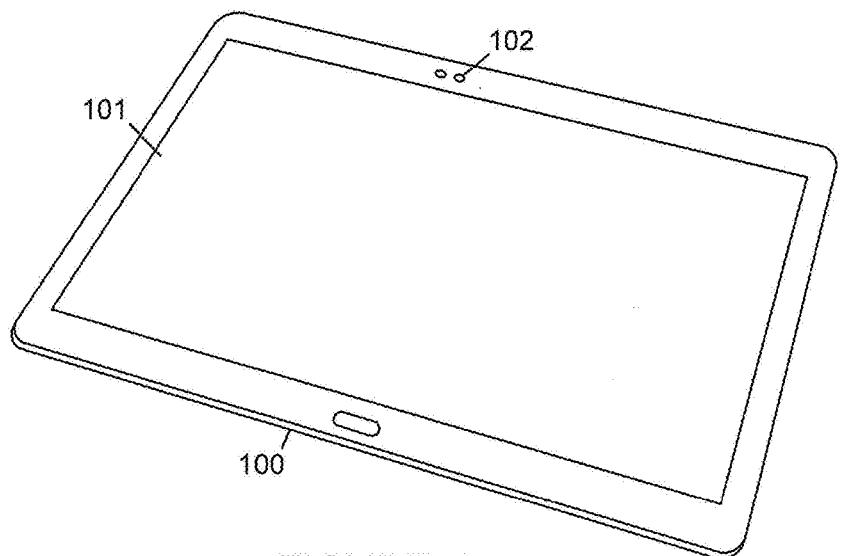
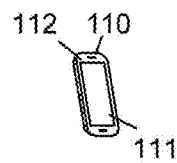
FIGURE 1A
FIGURE 1B
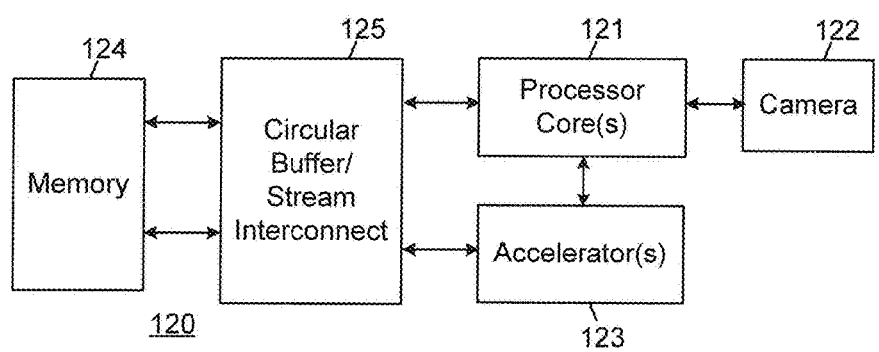
FIGURE 1C

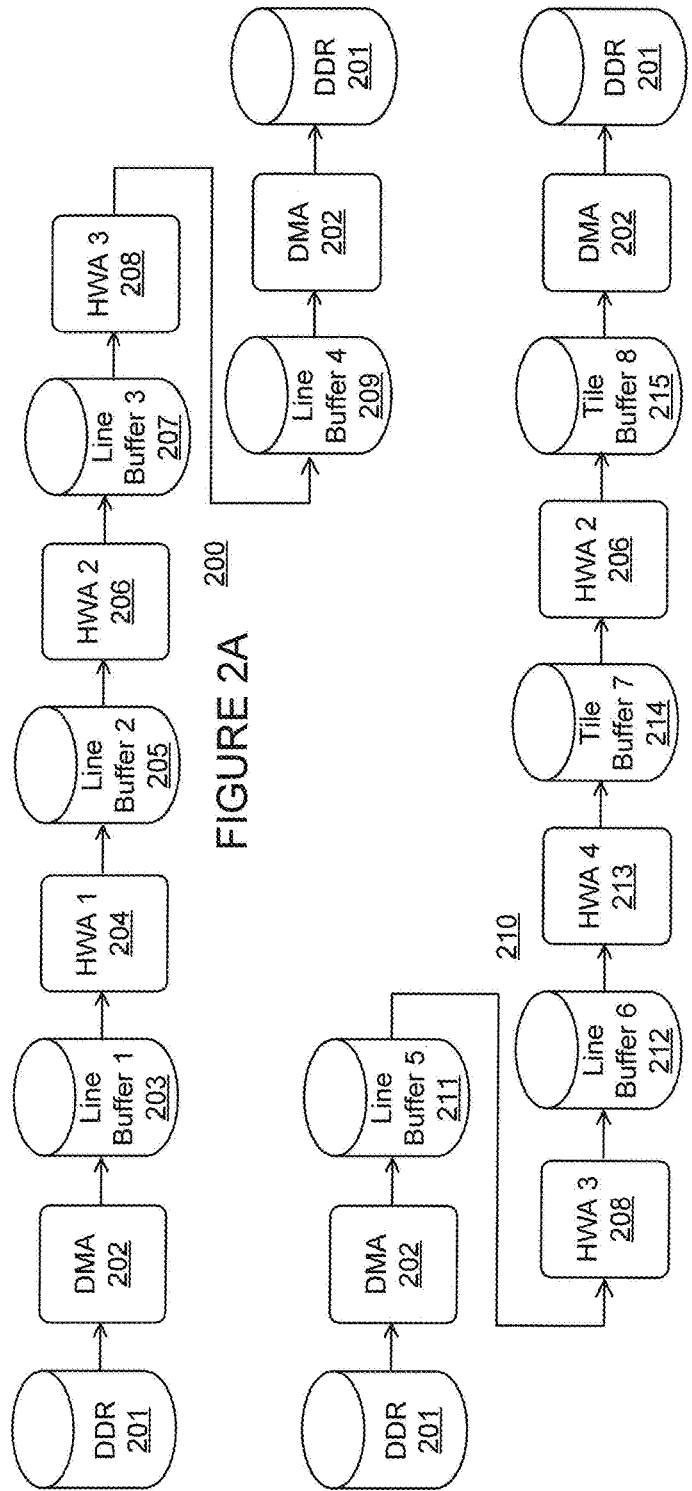

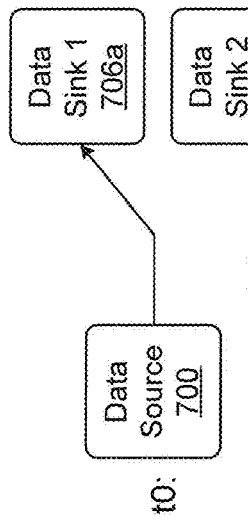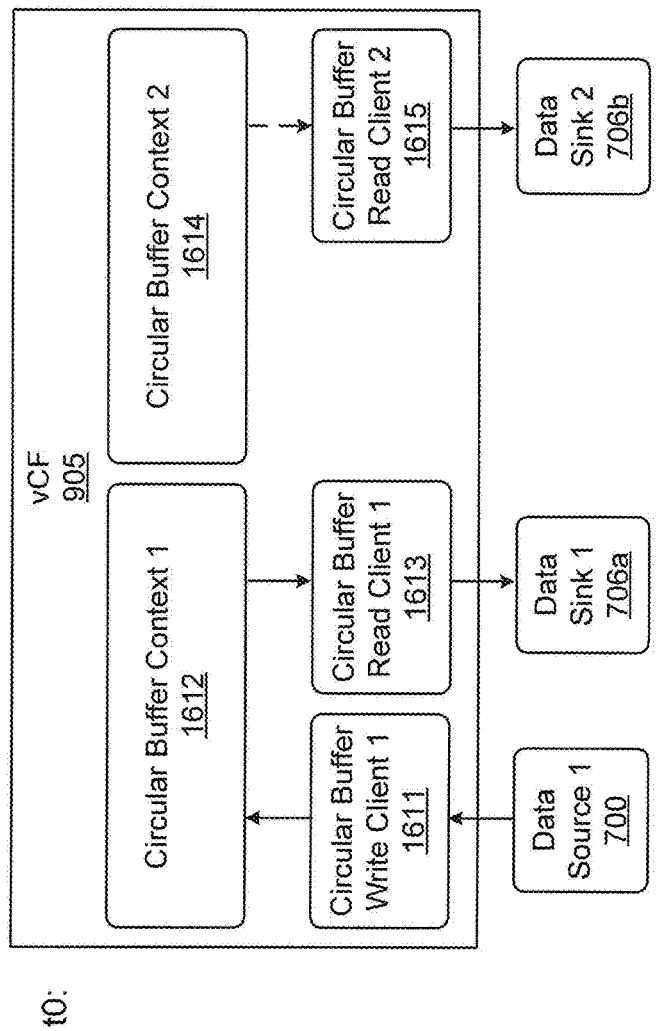

HARDWARE ARCHITECTURE FOR ACCELERATION OF COMPUTER VISION AND IMAGING PROCESSING

TECHNICAL FIELD

The present disclosure relates generally to data interconnects and memory architecture within computer vision and imaging data processing systems, and more specifically to supporting different interconnect configurations for computer vision and imaging applications in mobile devices.

BACKGROUND

Imaging and computer vision subsystems composed of multiple specialized hardware accelerators and internal storage (memories) require a flexible and efficient streaming interconnect to transfer data between constituent hardware accelerators.

SUMMARY

An image and computer vision processing architecture included a plurality of image processing hardware accelerators and a plurality of computer vision hardware accelerators each configured to perform a different one of a plurality of image processing and computer vision operations on image data captured through a camera. A multi-port memory shared by the hardware accelerators stores the image data and is configurably coupled by a sparse crossbar interconnect to one or more of the hardware accelerators depending on a use case employed. The interconnect provides accesses of the image data stored in memories to the hardware accelerators. Two or more of the hardware accelerators are chained to operate in sequence in a first order for a first use case, and at least one of the hardware accelerators is set to operate for a second use case. Portions of the memory inside the image and computer vision processing subsystem are allocated to the hardware accelerators based on the use case employed, with an allocated portion of the memory configured as a circular buffer, tile buffer, or other required access buffer. The interconnect, which provides flexible routing between multi-port memories and image/vision hardware accelerators, includes a head pointer bus carrying a head pointer and a tail pointer bus carrying a tail pointer for the circular buffer, which is used by the image/vision hardware accelerators. Different combinations of the hardware accelerators are configurably chained to operate in sequence in different orders for different use cases. Combinations of the hardware accelerators are chained by allocating shared memory as a buffer between consecutive hardware accelerators in the corresponding sequence. The shared memory includes multiple, concurrently accessible static random access memory (SRAM) banks configured to be allocated in portions to the hardware accelerators employed in a current use case. Portions of multiple SRAM banks may be allocated as one of an input buffer or an output buffer for a hardware accelerator. The interconnect connects a read port for a hardware accelerator employed in the current use case to one or more SRAM banks containing memory allocated to store image data on which the hardware accelerator will operate and connects a write port for the hardware accelerator to one or more SRAM banks for memory allocated to store image data produced by hardware accelerator. Portions of shared memory allocated to a hardware accelerator may be configured as a tile buffer. In the shared SRAM banks, circular buffer(s) and tile buffer(s) can be allocated together depending upon the employed use-case.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1A is an illustration of one user device within which the hardware architecture for acceleration of computer vision and imaging processing may be implemented in accordance with one embodiment of the present disclosure;

FIG. 1B is an illustration of an alternate user device within which the hardware architecture for acceleration of computer vision and imaging processing may be implemented in accordance with one embodiment of the present disclosure;

FIG. 1C is a high level block diagram of functional components within a user device of the type illustrated in FIGS. 1A and 1B;

FIGS. 2A through 2C illustrate different use cases that the hardware architecture for acceleration of computer vision and imaging processing in accordance with one embodiment of the present disclosure should support;

FIGS. 16A, 16B, 16C and 16D are logical diagrams and programming model diagrams for transitioning hardware accelerators between streams using the hardware architecture for acceleration of computer vision and imaging processing in accordance with an embodiment of the present disclosure;

DETAILED DESCRIPTION

Figure 3A:
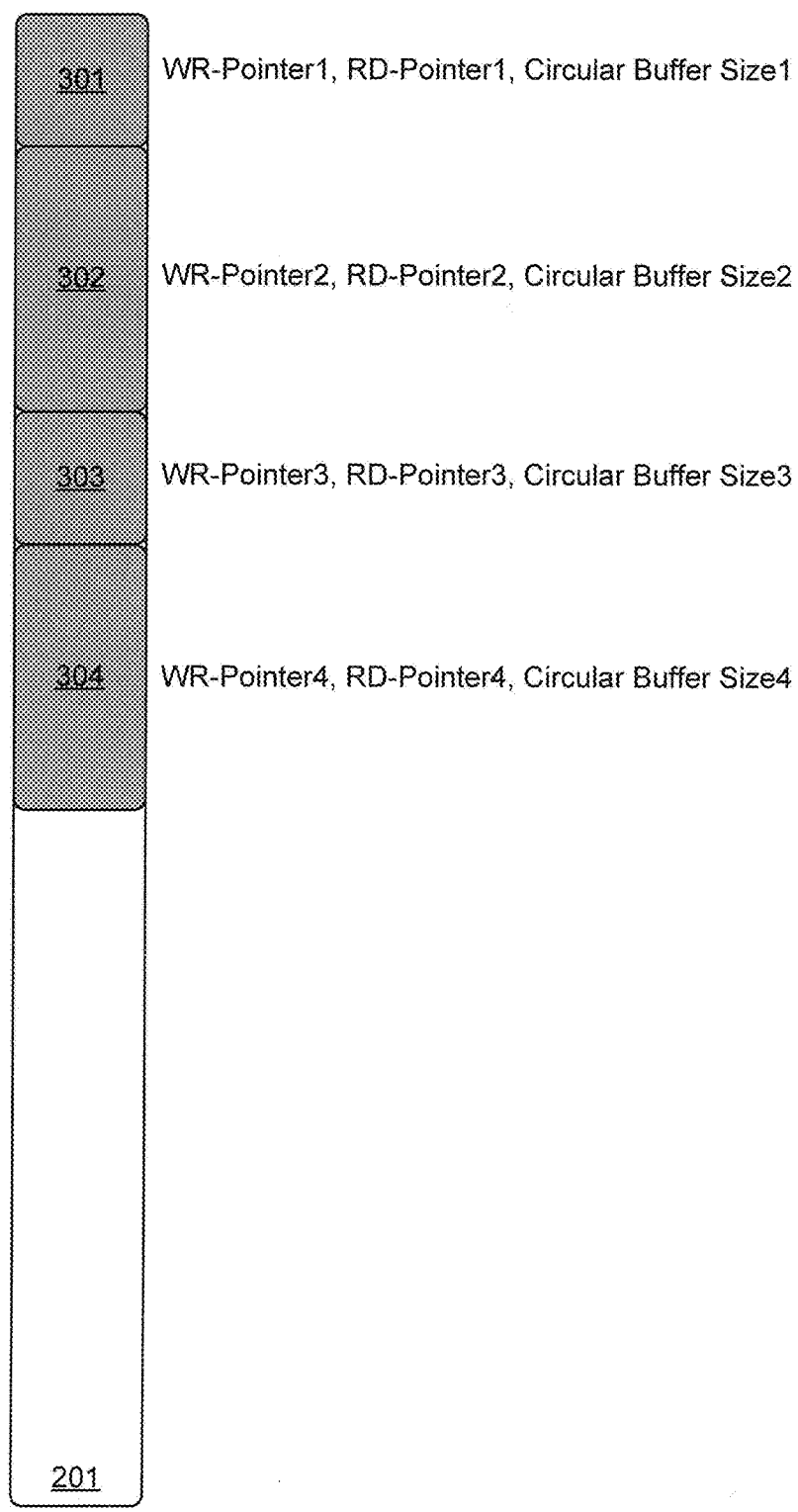
FIGS. 3A through 3C illustrate memory allocation of shared memory space for the use cases of FIGS. 2A through 2C, respectively.

FIGS. 1A through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged computer vision or imaging system in a mobile device.

Computer or "machine" vision seeks to emulate or enhance human vision by electronically perceiving and understanding image(s) (including video content) by one or both of transforming visual information into content that can be otherwise processed or interpreting visual information. A simplistic example is optical character recognition, or the transformation of printed or handwritten text images into digital text strings. A wide range of processes for vision perception are automated and integrated through computer vision, such as acquiring, processing, analyzing, and understanding image data. A few of the applications for computer vision include: object (e.g., facial) recognition and content-based image retrieval; motion tracking, estimation or analysis; medical imaging analysis; and scene or image reconstruction or restoration.

Efficient and high performance imaging and computer vision processing is becoming important on mobile devices such as smartphones, tablets and wearables. Hardware accelerators that are specialized for imaging and vision tasks are important to achieving low-power implementation and high performance processing for such mobile devices. In particular, use cases for imaging and computer vision applications require the chaining of multiple hardware accelerators to form a computation graph. Therefore, imaging and computer vision acceleration subsystems composed of multiple specialized hardware accelerators require a flexible and efficient streaming interconnect to transfer data between its hardware accelerators.

The interconnect must be flexible enough to support a wide range of known and unknown imaging and computer vision applications. Applications deployed in the final product may require the processing elements of the imaging and computer vision acceleration subsystem to be chained in various ways, including ways that may not have been anticipated during the design phase of a system-on-chip (SoC). Having sufficient flexibility ensures that even those cases are well supported.

The interconnect, which connects internal storage/memories and hardware accelerators, must be able to support high bandwidth and low latency transfers, and must further be able to easily scale to meet requirements of anticipated applications. Imaging and computer vision processing involves large amounts of data transfers between processing elements and storage elements. The timely and efficient transfer of that data is significant due to the real-time nature of imaging and computer vision applications or improving benefits for mobile device users. In these applications, any failure to meet performance requirements for data transfer translates into reduced performance of the application. In particular, these requirements increase with each product generation to accommodate larger frame sizes and higher frame rates.

FIG. 1A is an illustration of one user device within which the hardware architecture for acceleration of computer vision and imaging processing may be implemented in accordance with one embodiment of the present disclosure. The user device in the example of FIG. 1A is a tablet 100, a handheld data access and processing system. The housing of the tablet 100 supports a touchscreen display 101, which accepts user input in the form of one or more touches to (or proximate to) the surface of the touchscreen display, and responds to user input in the form of gestures (e.g., "swiping" or "pinching"). In addition to receiving user input, the touchscreen display 101 displays images and/or plays videos that are either acquired by a camera integrated with tablet 100 or received electronically from external sources. The housing of the tablet 100 also supports at least one lens 102 through which light is allowed to pass and impinge upon an internal photosensor array. The lens 102 and internal photosensor array form the camera by which the tablet 100 may acquire a still image or video.

FIG. 1B is an illustration of an alternate user device within which the hardware architecture for acceleration of computer vision and imaging processing may be implemented in accordance with one embodiment of the present disclosure. The user device in the example of FIG. 1B is a smartphone 110, or a handheld wireless voice communications device that also provides data access and processing of camera-captured data. As with tablet 100, the housing of the smartphone 110 supports a touchscreen display 111 and at least one lens 112, with the lens 112 and an associated internal photosensor array forming a camera by which the smartphone 110 acquires still images or videos. In still other alternatives, the user device may be a wearable device such as Google Glass, Samsung Gear VR, or the like.

FIG. 1C is a high level block diagram of functional components within a user device of the type illustrated in FIGS. 1A and 1B. User device 120 is preferably one of user device 100, user device 110, or any of the other user devices mentioned herein. User device 120 includes one or more processor(s) 121, or, equivalently to a single processor for the purposes of this disclosure, multiple processor cores contained within a single integrated circuit package. Processor(s) 121 controls overall operation of the user device 120. Processor(s) 121 are communicably coupled to a camera 122 within the user device 120, which may have the previously-described structure and which enables the user device 120 to acquire still images or videos as described above. Processor(s) 121 may be coupled to camera 122 by connection via one or more image signal processors. Processor(s) 121 may execute one or more computer vision and/or imaging application(s) utilizing the camera 122 to acquire image data.

Processor(s) 121 are communicably coupled (by a bus or the like) to memory 123. One portion of memory 123 may be implemented as nonvolatile storage, such as a solid state disk or the like, and may store the executable code for the computer vision and/or imaging application(s) executed by the processor(s) 121. The nonvolatile (or persistent) portion of memory 123 may also store image data on which the computer vision and/or imaging application(s) operate during execution. Another portion of memory 123 may be implemented as operational memory, such as the static random access memory (SRAM) described below or similar memory, and may store portions of or copies of the image data on which the computer vision and/or imaging application(s) operate during execution.

Also communicably coupled to both the processor(s) 121 and the memory 123 are one or more hardware accelerators 124, each of which is configured to perform one or more specific machine vision, graphics or image processing tasks as discussed in further detail below. The accelerators 124 operate, under the control of processor(s) 121, on image data (which, as used herein, includes video data) acquired by the camera 122 or stored within the memory 123. The accelerators 124 may operate on image data stored in memory 123 regardless of whether that stored image data was acquired by the camera 122 or obtained via a communications channel (not shown) from a source external to user device 120.

Memory 123 stores at least image data (and may also store other types of data or information, as well) and is communicably coupled to processor(s) 121 and accelerators 123 by a circular buffer/stream interconnect 125. The circular buffer/stream interconnect 125 is structured and operates as described in further detail below to facilitate acceleration of computer vision and imaging processing. The present disclosure includes a circular buffer/stream interconnect 125 that is suitable for use in an imaging and computer vision processing subsystem composed of multiple hardware accelerators whose inputs and outputs consist of image streams and/or other data streams. The circular buffer/stream interconnect 125 allows any data stream being output by any hardware accelerator to be transferred to any input of any hardware accelerator by using a multi-ported memory subsystem as a shared transfer medium. A circular buffer data structure with programmable size is employed to hold a segment of each data stream inside the memory subsystem, thus enabling flexible manipulation of the stream, such as delayed reads, rate matching, one-to-many streaming, and windowed reading etc. Specialized adapters convert image streams to circular buffer data structures and back to streams, handling all of the circular buffer data structure manipulation in an efficient manner. Synchronization of the circular buffer data structure state between participating input adapter and output adapter(s) is performed efficiently through two broadcasting buses (head-pointer bus and tail-pointer bus).

For each of FIGS. 1A through 1C, the complete structure and operation of the respective devices or systems are not depicted or described herein. Instead, for simplicity and clarity, only so much of the structure and operation as is different from other devices or systems or necessary for an understanding of the present disclosure is depicted and described.

Point-to-point streaming interconnects may be employed for connections between processing elements when connectivity requirements are known in advance, especially where real-time operation is required, such as between processing kernels in image signal processors (ISPs). Within such point-to-point streaming interconnects, data flows in one direction, from data sources to data sinks. Some flexibility may be built into point-to-point interconnects using multiplexers. Often, however, point-to-point interconnects do not support flow control, which means that if a data sink is not able to accept the data being transferred, the data is simply dropped. Since many hardware accelerators require additional processing time at the beginning and end of frames and lines, blanking periods may be inserted at the beginning and end of frames and lines to avoid dropping data.

Circular buffers may be implemented in limited form by hardware first-in, first-out (FIFO) buffers, which have a fixed buffer size, one writer, one reader, and only allows sequential read and write access. Streaming through circular buffers can be achieved with a memory mapped interconnect, in which case all data and control messages required to maintain the circular buffer would go through the interconnect. Memory-mapped interconnects such as ARM Corelink and Arteris NoC are often employed as general-purpose system-level interconnects in SoCs. These interconnects employ a master-slave model, in which masters make transaction requests that are serviced by slaves. Transaction types usually include at least read and write operations. Slaves are selected based on address. Multiple masters and multiple slaves may be connected to the same memory-mapped interconnect. When multiple masters compete for the same interconnect resource (e.g., both attempt to access the same slave or need to go through the same intermediate routing resource) via conflicting write and/or read operations, an arbitration scheme may ensure correct operation by blocking some of the requests. These interconnects support standard bus interface protocols such as the Advance High-performance Bus (AHB) protocol, the Advanced eXtensible Interface (AXI) protocol, the Advanced Peripheral Bus (APB) protocol, and Open Core Protocol (OCP) to interface with masters and slaves, though internally each may use proprietary signaling to improve efficiency and performance. Memory-mapped interconnects are flexible and can have moderately high throughput, but may suffer from high latency and reduced performance when there is congestion.

The challenge of designing a system supporting an imaging and vision architecture of the type described herein lies in the memory architecture. Application-specific hardware accelerators to implement image and computer vision digital signal processing functions are important to achieving low-power and high-performance computing. In addition, the memory architecture employed must provide sufficiently high bandwidth to each hardware accelerator, provide flexible connections among hardware accelerators and memories (storage element(s)), enable concurrent running of hardware accelerators, minimize external memory access to save power, etc. Different imaging/vision use cases require chaining of multiple hardware accelerators and/or digital signal processing kernels to form various computation graphs. The solution should implement memory sharing to support concurrent computation graphs, with a flexible interconnect to support a wide range of known and unknown imaging and vision applications. High bandwidth and low latency will enable efficient processing and minimize data movement overhead cycles, while scalability will meet future application requirements such as larger frame sizes or higher frame rates.

FIGS. 2A through 2C illustrate different use cases that the hardware architecture for acceleration of computer vision and imaging processing in accordance with one embodiment of the present disclosure should support. In FIG. 2A, a first use case 200 in which image data within memory ("DDR") 201 is retrieved by a memory access unit ("DMA") 202 into a first line buffer 203, from which data is read and into which data is written in raster lines. A first hardware accelerator 204 receives and operates on image data from the line buffer 203, writing the results into a second line buffer 205. A second hardware accelerator 206 receives and operates on image data from the second line buffer 205, writing the results into a third line buffer 207. A third hardware accelerator 208 receives and operates on image data from the third line buffer 207, writing the results into a fourth line buffer 209. The memory access unit 202 writes image data from the fourth line buffer 209 to memory 201.

FIG. 2B illustrates a second use case 210 in which the order of operation changes from a first sequence of operation by the first hardware accelerator 204, then the second hardware accelerator 206, and then the third hardware accelerators 208 to a second sequence of operation by the third hardware accelerator 208, then the fourth hardware accelerator, and then the second hardware accelerator 206. Different line buffers 211 and 212 are established between the memory 201 and the third hardware accelerator 208 and between the third hardware accelerator 208 and a fourth hardware accelerator 213 for the second use case 210 than those employed for the first use case 200. The output of the fourth hardware accelerator 213 is written to a seventh buffer 214, a tile buffer from which data is read and into which data is written in tiles of pixel arrays. From seventh buffer 214, the second hardware accelerator 206 receives and operates on image data, writing results into an eighth buffer 215, which is also a tile buffer.

FIG. 2C illustrates a third use case 220 in which only the fourth hardware accelerator 213 operates on image data. In the third use case 220, a single line buffer 220 and a tile buffer 221 store image data on which the fourth hardware accelerator 213 operates and the results of that operation, respectively.

Figure 3B:
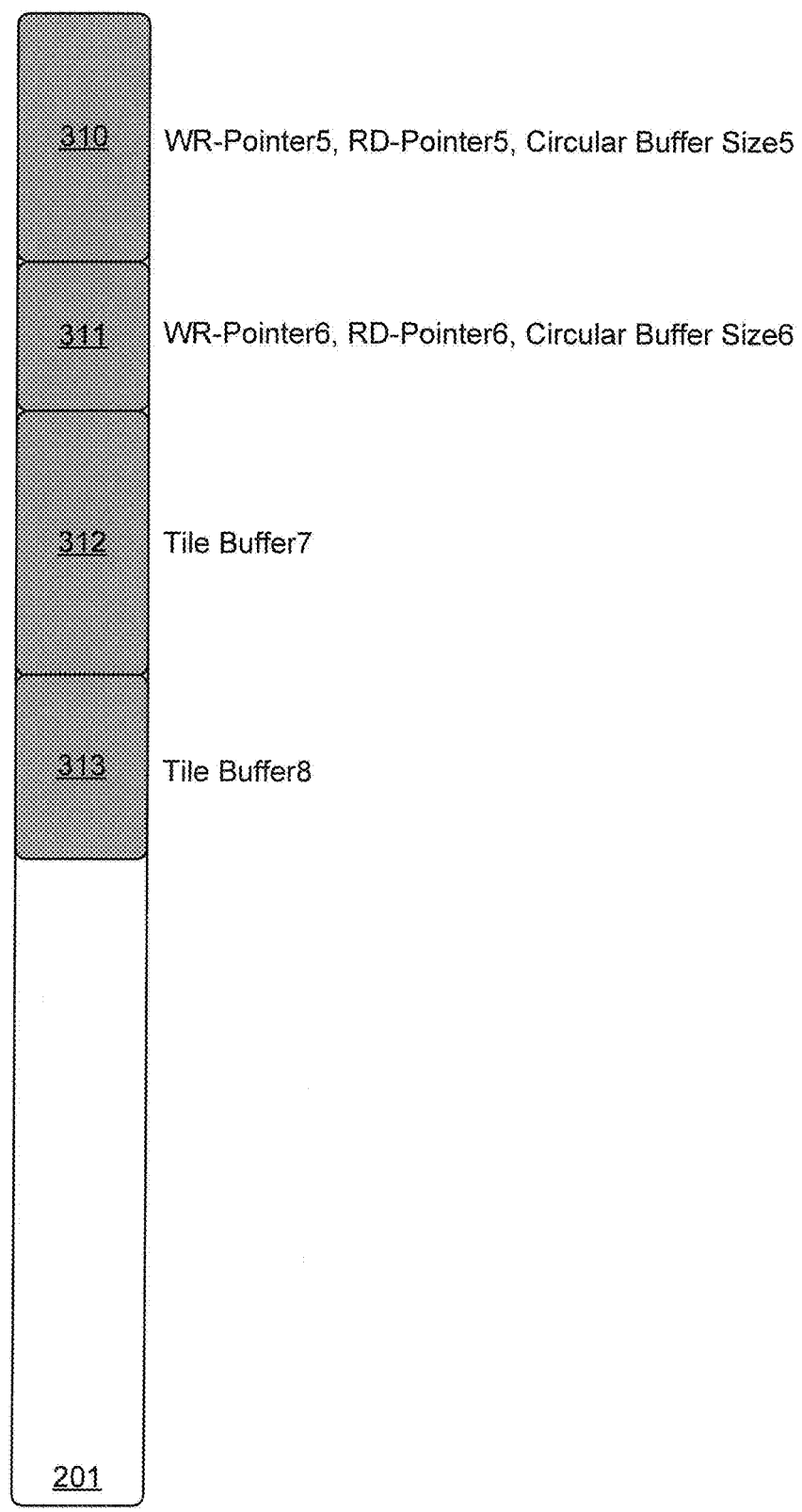
Figure 3C:
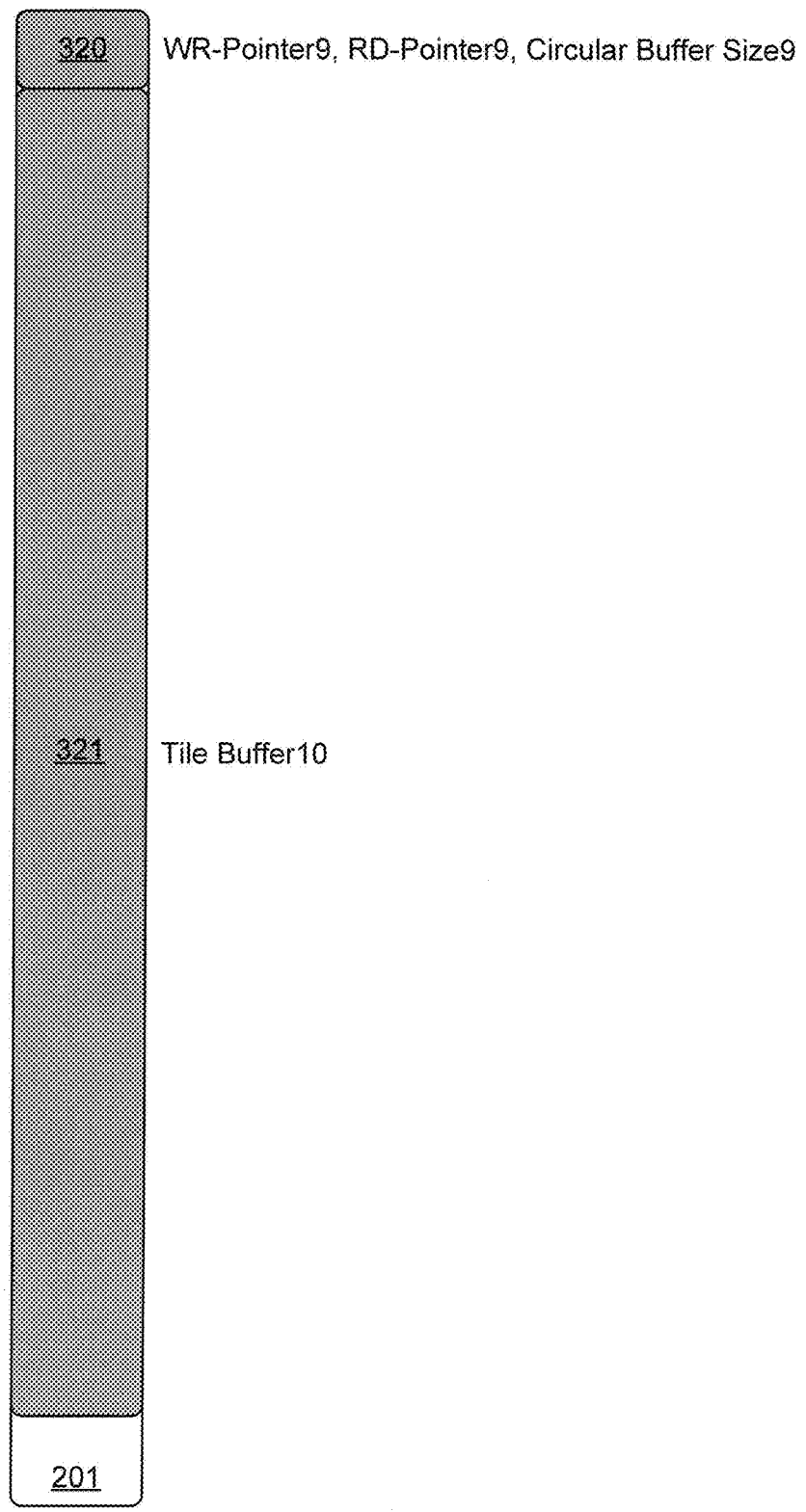

FIGS. 3A through 3C illustrate memory allocation of shared memory space for the use cases of FIGS. 2A through 2C, respectively. The shared memory space 201 may be reconfigured by software depending upon the use case. For the first use case 200 of FIG. 2A, the shared memory space 201 is allocated as shown in FIG. 3A: a first circular buffer 301 with a first write pointer, read pointer, and circular buffer size is allocated as the first line buffer 203 in FIG. 2A; a second circular buffer 302 with a second write pointer, read pointer, and circular buffer size is allocated as the second line buffer 206 in FIG. 2A; a third circular buffer 303 with a third write pointer, read pointer, and circular buffer size is allocated as the third line buffer 207 in FIG. 2A; and a fourth circular buffer 304 with a fourth write pointer, read pointer, and circular buffer size is allocated as the fourth line buffer 209 in FIG. 2A.

For the second use case 210 of FIG. 2B, the shared memory space 201 is allocated as shown in FIG. 3B: fifth and sixth circular buffers 310 and 311, respectively, each with respective fifth and sixth write pointers, read pointers and circular buffer sizes are allocated as the fifth and sixth line buffers 211 and 212, respectively, in FIG. 2B. Tile buffers 312 and 313 are allocated as buffers 214 and 215 in FIG. 2B. For the third use case 220 of FIG. 2C, the shared memory space 201 is allocated as a circular buffer 320 for line buffer 220 in FIG. 2C, and as buffer 321 for tile buffer 221. The shared memory space 201 is thus reconfigurable for different use cases, including portions for each hardware accelerator employed by a use case and as a circular buffer where possible and as a tile buffer when necessary.

Figure 4:
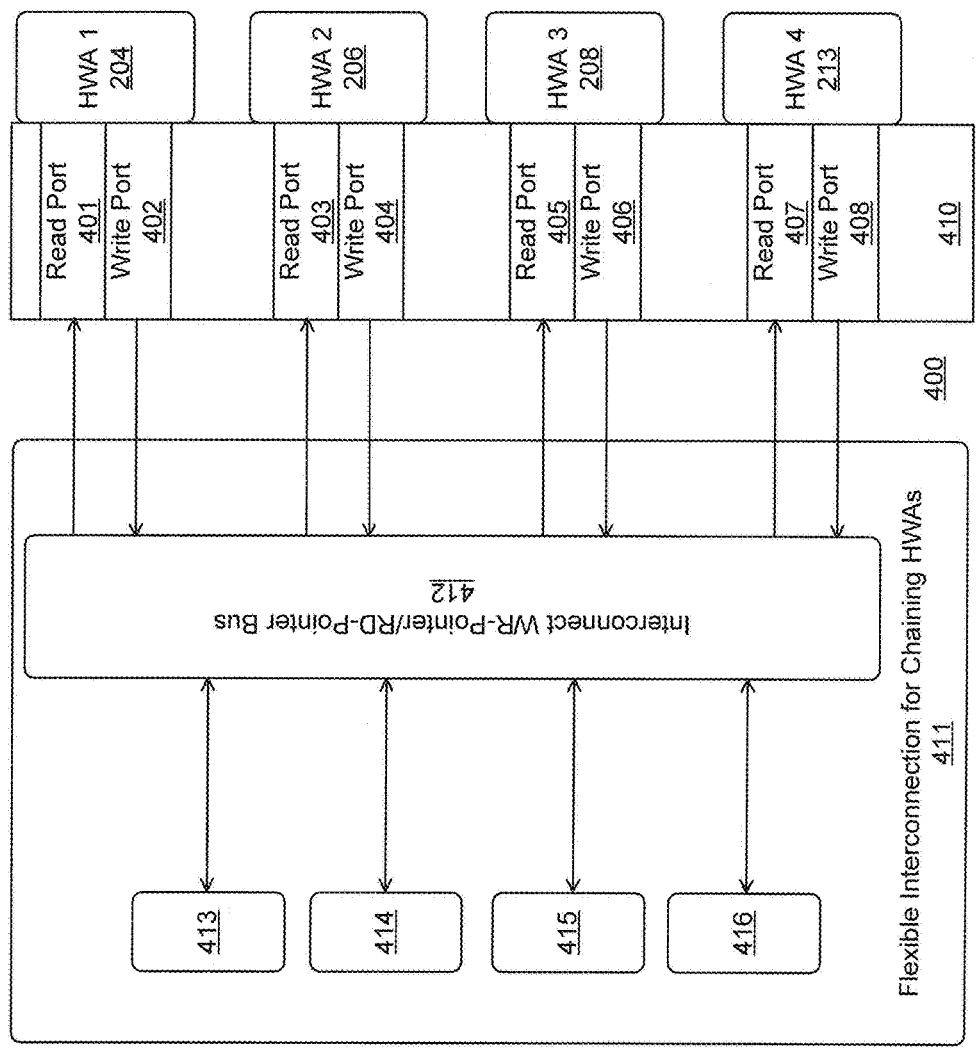
FIG. 4 is a diagram illustrating the manner in which memory access is implemented for a shared memory space for any of the use cases of FIGS. 2A through 2C.

FIG. 4 is a diagram illustrating the manner in which memory access is implemented for a shared memory space for any of the use cases of FIGS. 2A through 2C. Hardware accelerators 204, 206, 208 and 213 are coupled to the memory subsystem via read and write ports. Hardware accelerator 204 is coupled to the memory subsystem by read port 401 and write port 402. Hardware accelerator 206 is coupled to the memory subsystem by read port 403 and write port 404. Hardware accelerator 208 is coupled to the memory subsystem by read port 405 and write port 406. Hardware accelerator 213 is coupled to the memory subsystem by read port 407 and write port 408. Read ports 401, 403, 405, and 407 and write ports 402, 404, 406 and 408 collectively form an access system 410 that is configured by software to set up the memory space allocated to each hardware accelerator 204, 206, 208 and 213 based on the use case being employed for current operations, sharing a single memory space 201. The access system 410 couples the hardware accelerator 204, 206, 208 and 213 to a flexible interconnection system 411 for chaining the hardware accelerators 204, 206, 208 and 213. The flexible interconnect system 411 includes an interconnect write pointer and read pointer bus 412 connecting the read and write ports 401-408 to memory, implemented as four memory banks 413, 414, 415 and 416 in the example shown. High bandwidth hardware data transfers are enabled by the interconnect system 411, including the interconnect write pointer and read pointer bus 412.

Figure 5A:
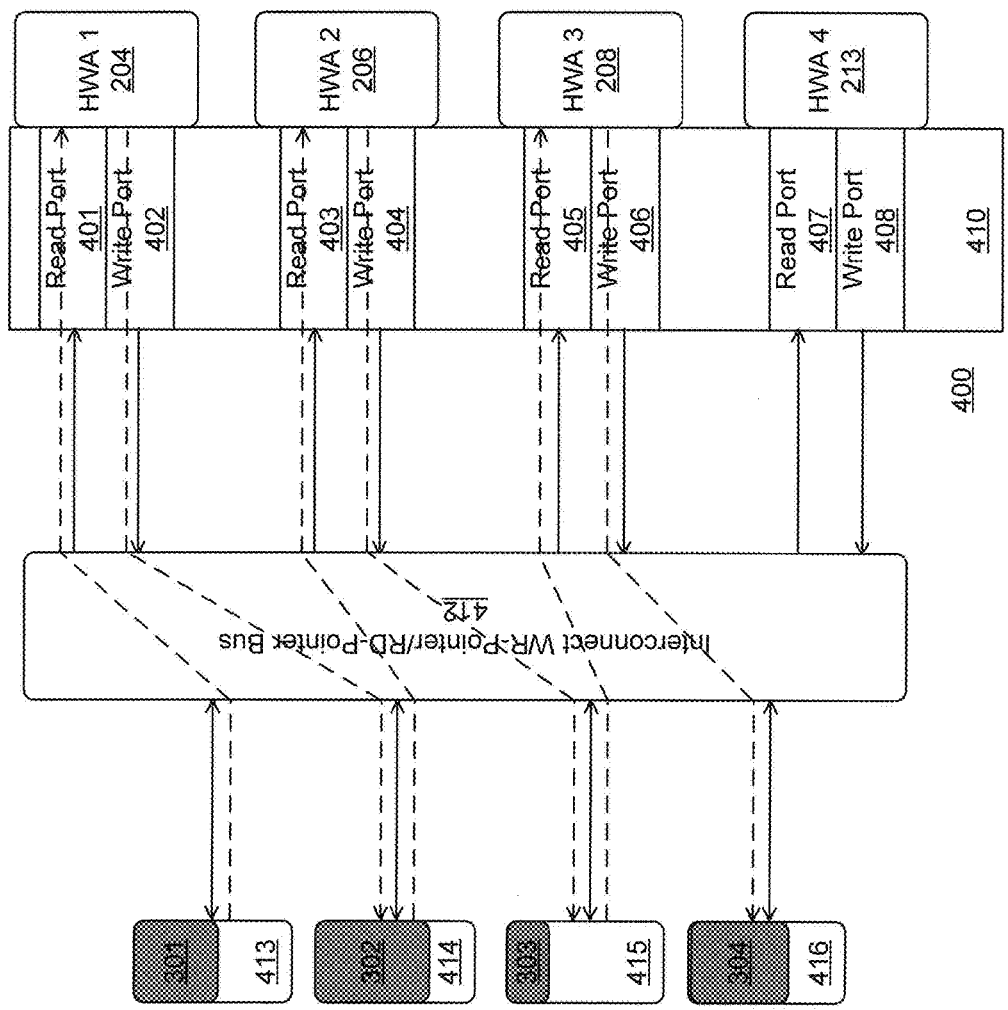
FIGS. 5A through 5C are diagrams illustrating memory access for a shared memory space for the use cases of FIGS. 2A through 2C, respectively.
Figure 5B:
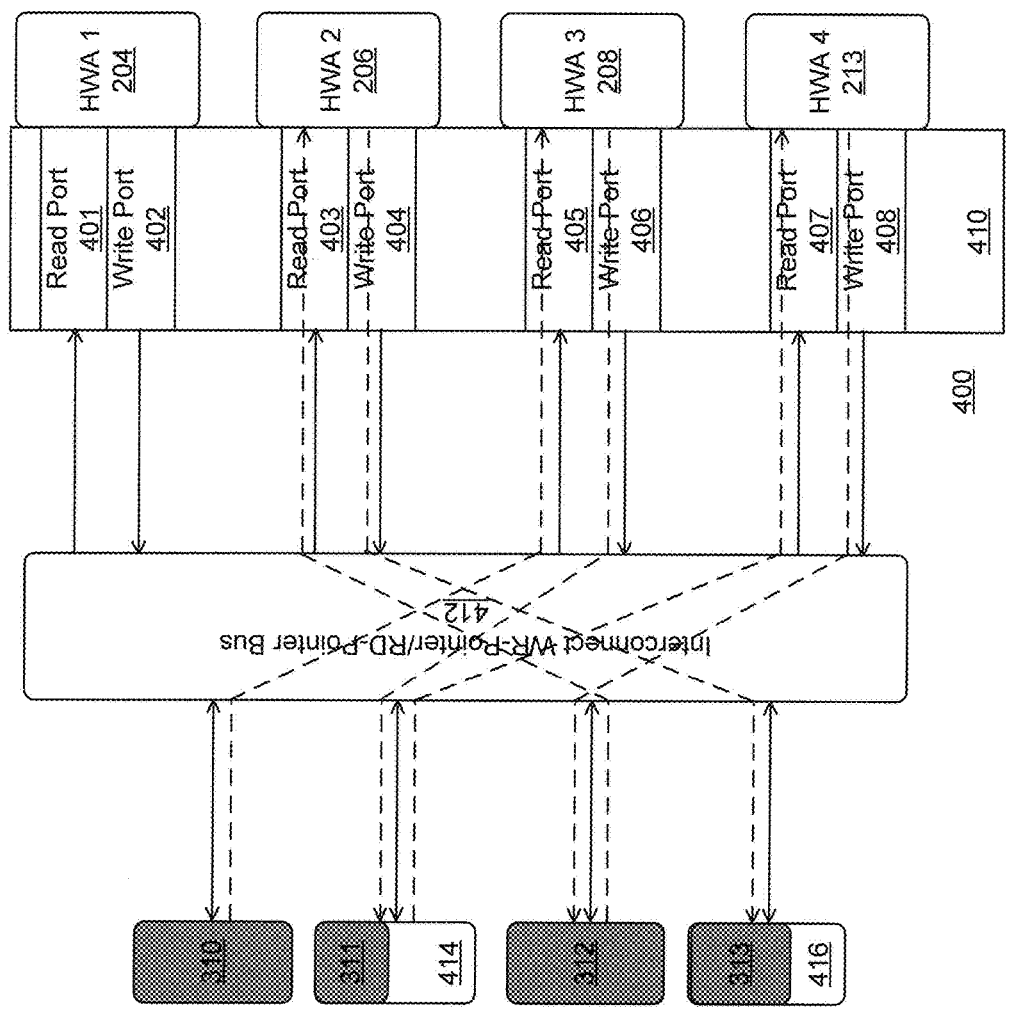
Figure 5C:
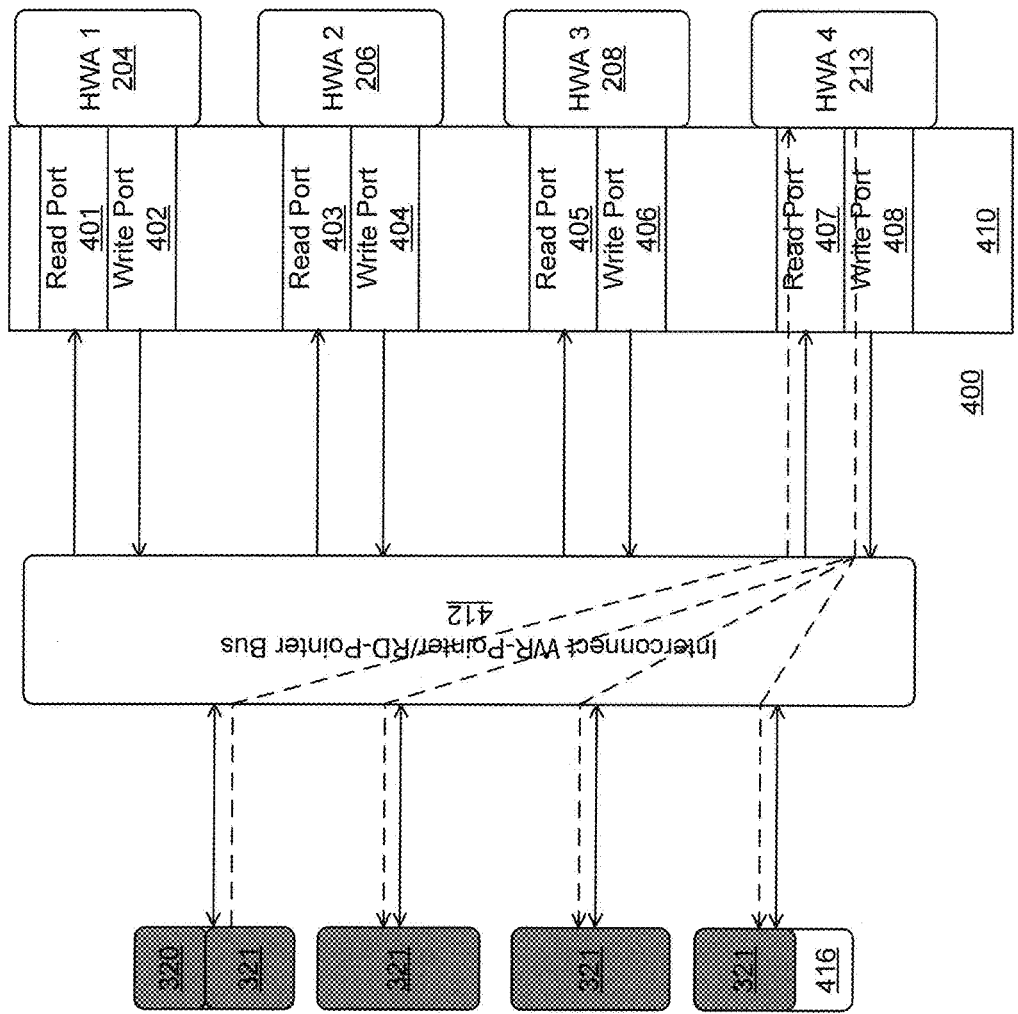

FIGS. 5A through 5C are diagrams illustrating memory access for a shared memory space for the use cases of FIGS. 2A through 2C, respectively. FIG. 5A illustrates the connections established for use case 200 in FIG. 2A from read ports 401, 403 and 405 and write ports 402, 404 and 406 to memories 413-416 by interconnect system 411. A portion of memory bank 413 is allocated as line buffer 301, a portion of memory bank 414 as line buffer 302, a portion of memory bank 415 as line buffer 303, and a portion of memory bank 416 as line buffer 304. Read port 401 is connected to memory bank 413. Write port 402 and read port 403 are connected to memory bank 414. Write port 404 and read port 405 are connected to memory bank 415. Write port 406 is connected to memory bank 416.

FIG. 5B illustrates the connections established for use case 210 in FIG. 2B from read ports 403, 405 and 407 and write ports 404, 406 and 408 to memories 413-416 by interconnect system 411. A portion of memory bank 413 is allocated as line buffer 310, a portion of memory bank 414 as line buffer 311, a portion of memory bank 415 as tile buffer 312, and a portion of memory bank 416 as tile buffer 313. Read port 405 is connected to memory bank 413. Write port 406 and read port 407 are connected to memory bank 414. Write port 408 and read port 403 are connected to memory bank 415. Write port 404 is connected to memory bank 416.

FIG. 5C illustrates the connections established for use case 220 in FIG. 2C from read port 407 and write port 408 to memories 413-416 by interconnect system 411. A portion of memory bank 413 is allocated as line buffer 320, with the remainder of memory bank 413, all of memory banks 414 and 415, and a portion of memory bank 416 allocated as tile buffer 321. Read port 407 is connected to memory bank 412, and write port 408 is connected to each of memory banks 413-416.

Figure 6A:
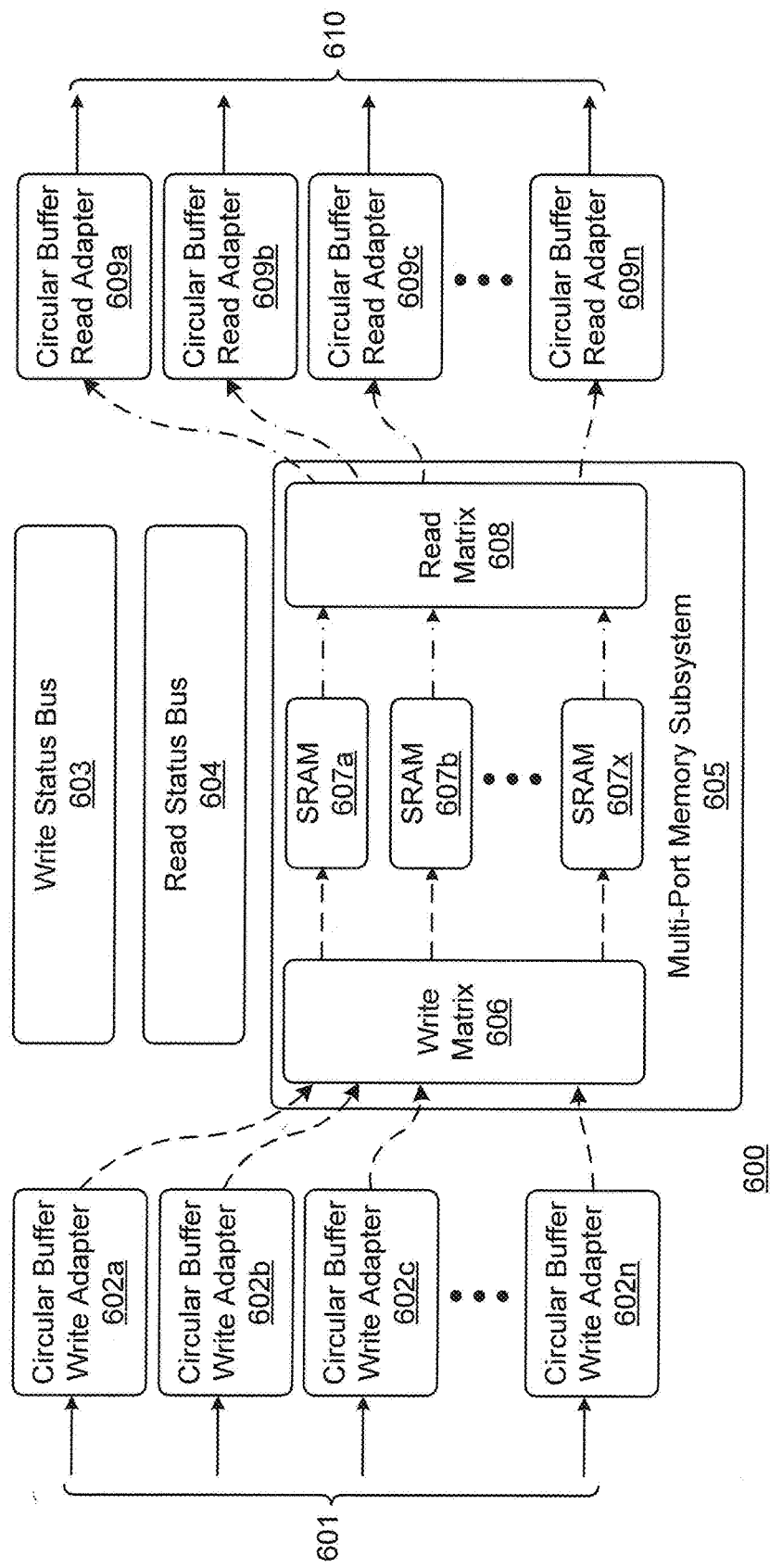
FIGS. 6A through 6C are conceptual block diagrams for a circular buffer streaming interconnect and associated memory subsystem within the hardware architecture for acceleration of computer vision and imaging processing in accordance with an embodiment of the present disclosure.
Figure 6B:
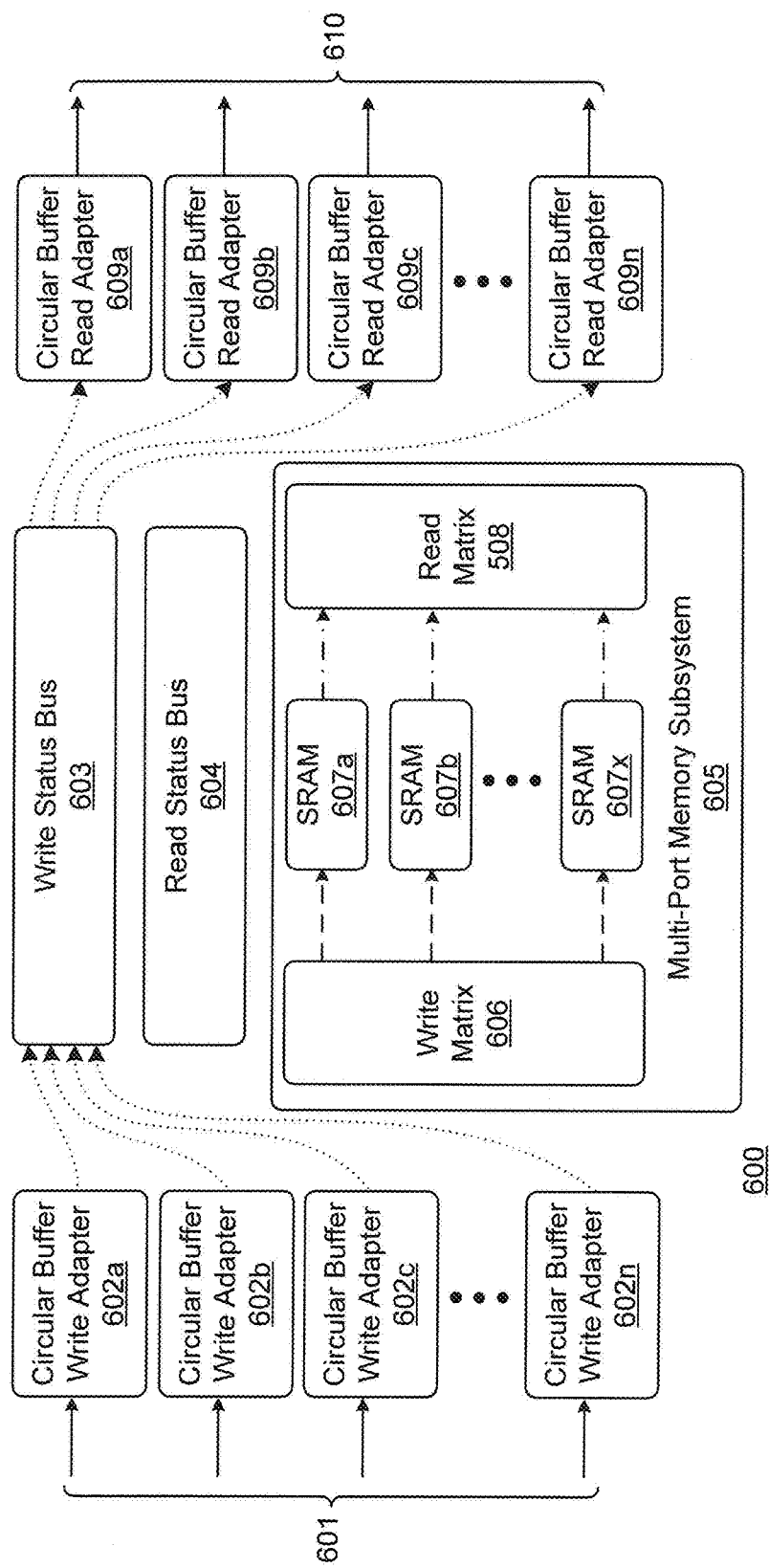
Figure 6C:
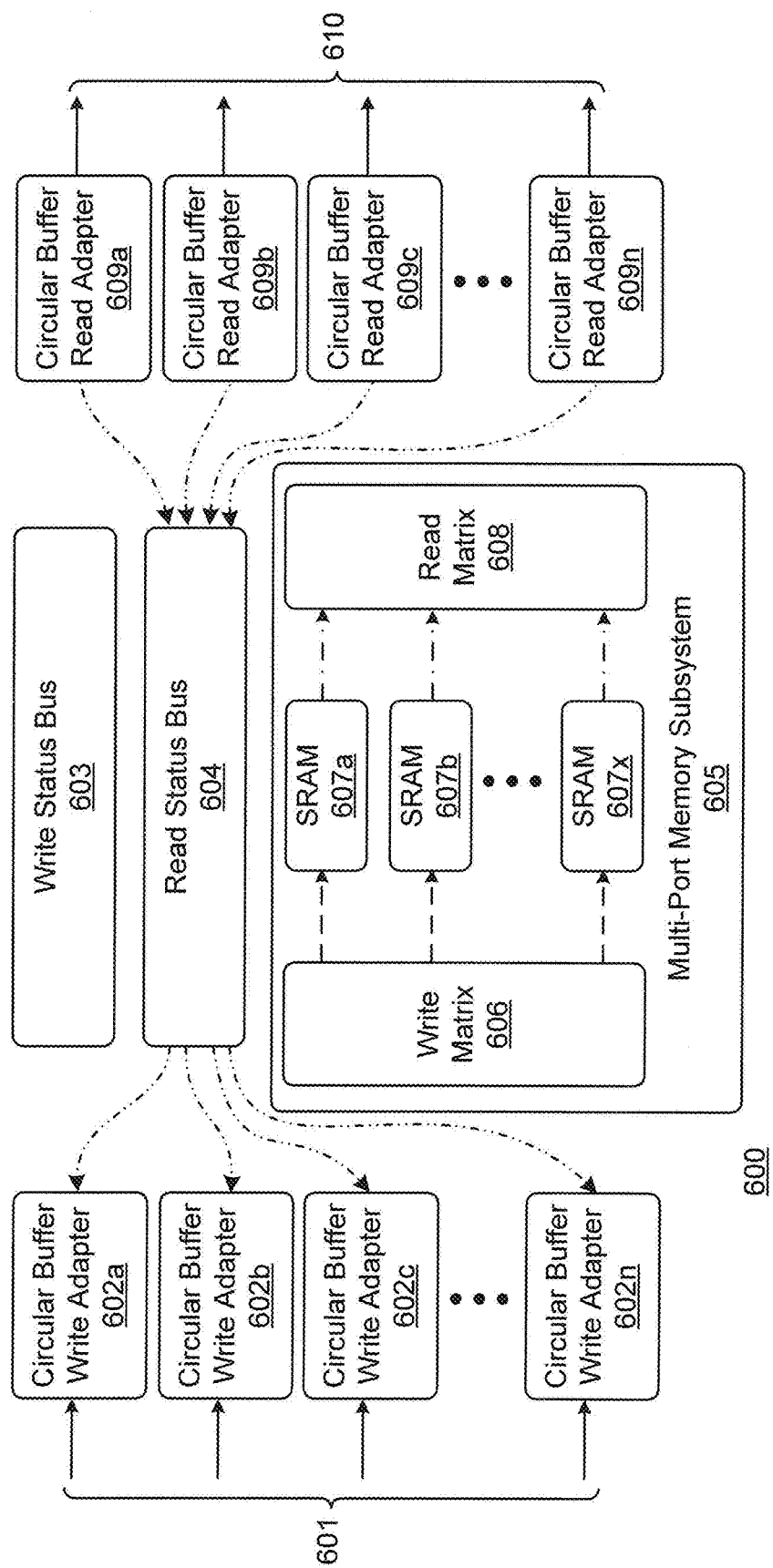

FIGS. 6A through 6C are conceptual block diagrams for a circular buffer streaming interconnect and associated memory subsystem within the hardware architecture for acceleration of computer vision and imaging processing in accordance with an embodiment of the present disclosure. The portion 600 of the circular buffer streaming interconnect 125 within the hardware architecture for acceleration of computer vision and imaging processing depicted in FIG. 6A through 6C encompasses the streaming interconnect in an image processing system that includes multiple hardware accelerators 124 with streaming inputs and outputs. The portion 600 of the hardware architecture for acceleration of computer vision and imaging processing may be adapted during operation for different use cases, including computer vision and imaging processing applications requiring processing elements to be chained in unanticipated ways.

A set of streaming inputs 601 each receive one of a plurality of data stream outputs from the hardware accelerators 124. Streaming inputs 601 transfer the received data stream content to a corresponding one of a set of circular buffer write adapters 602a-602n. Circular buffer write adapters 602a-602n write circular buffer data to a multi-port memory subsystem 605, which forms a portion of memory 123. Multi-port memory subsystem 605 contains an input or write interconnect matrix 606 that operates to write received data into one of SRAM memory banks 607a-607x in response to a write request from one of circular buffer write adapters 602a-602n. An output or read interconnect matrix 608 within multi-port memory subsystem 605 reads data from one of SRAM memory banks 607a-607x in response to a read request from one of circular buffer read adapter 609a-609n. Write status bus 603 and read status bus 604 synchronize circular buffer data access between write adapters 602a-602n and read adapters 609a-609n. Read adapters 609a-609n each transfer data steams to a corresponding one of outputs 610 that are coupled to data stream inputs of the hardware accelerators 124.

FIG. 6A illustrates the write and read data paths, as dashed and dash-dotted lines, respectively, from write adapters 602a-602n through write matrix 606 to one or more of SRAM banks 607a-607x and from one of SRAM banks 607a-607x through read matrix 608 to one of read adapters 609a-609n. FIG. 6B illustrates, as dotted lines, the paths of write status data from write adapters 602a-602n through write status bus 603 to read adapters 609a-609n for notifying that data has been written to the SRAM banks and is available for consumption. FIG. 6C illustrates, as dash-dotdotted lines, the paths of read status data from read adapters 609a-609n through read status bus 604 to write adapters 602a-602n for notifying that data has been consumed from the SRAM banks and may be overwritten.

Figure 7:
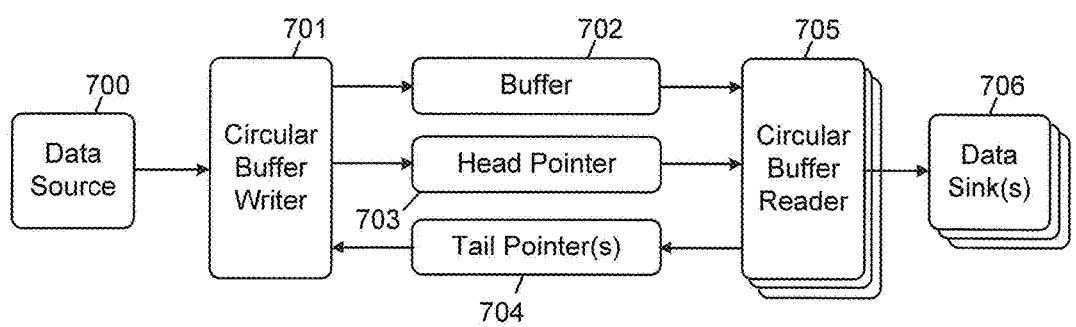
FIG. 7 is a conceptual block diagram of a circular buffer employed as part of the hardware architecture for acceleration of computer vision and imaging processing in accordance with an embodiment of the present disclosure.

FIG. 7 is a conceptual block diagram of a circular buffer employed as part of the hardware architecture for acceleration of computer vision and imaging processing in accordance with an embodiment of the present disclosure. The present disclosure employs the circular buffer data structure (whether operating on pixels or tiles) as the underlying transfer mechanism. The circular buffer data structure is suitable for data transfers in imaging and computer vision from a data source 700 to one or more data sink(s) 706. Circular buffers enable the streaming of large chunks of data, such as images, through a relatively small memory, such as SRAM 607a-607x implemented inside an SoC. The circular buffer implementation illustrated in FIG. 7 includes a shared buffer 702 in which actual data is stored, a circular buffer writer 701 having write access to the shared buffer 702, and one or more circular buffer readers 705 each having read access to the shared buffer 702. A head pointer 703, which indicates write progress, is transferred from shared buffer writer 701 to each of shared buffer readers 705. A tail pointer 704, which indicates read progress, is transferred from one of the shared buffer readers 705 performing a read to the shared buffer writer 701.

The circular buffer structure illustrated in FIG. 7 is suitable for transferring linearly addressable data. For example, two-dimensional (2D) image data can be mapped onto a linear address space and transferred using a circular buffer. The head pointer 703 is updated by circular buffer writer 701 to indicate that data at locations lower than the value indicated is valid. Each tail pointer 605 is updated by its respective circular buffer reader 705 to indicate that data at locations lower than the value indicated has been fully consumed and will not be needed in the future.

Figure 8:
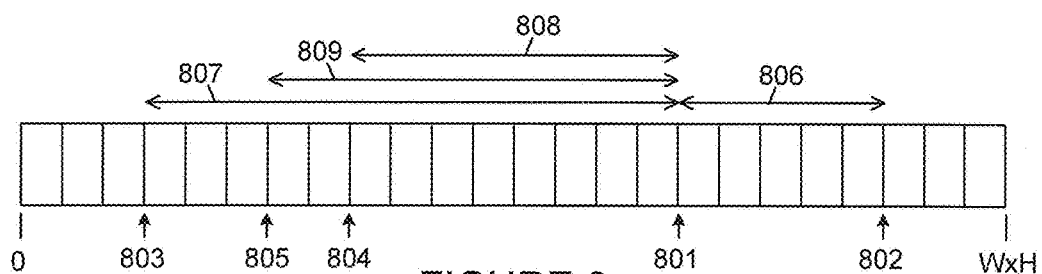
FIG. 8 is a diagram of a circular buffer addressing scheme employed as part of the hardware architecture for acceleration of computer vision and imaging processing in accordance with an embodiment of the present disclosure.

FIG. 8 is a diagram of a circular buffer addressing scheme employed as part of the hardware architecture for acceleration of computer vision and imaging processing in accordance with an embodiment of the present disclosure. The buffer 702 is addressed in blocks of storage of width W. The buffer entries having a starting address ranging from a value equal to a base address (0, in the example depicted) and a value less than an ending address of the last block (a value equal to the width W of the blocks times a height H or number of blocks within the buffer). The value 801 within head pointer 703 indicates the next buffer entry to which data may be written by the circular buffer writer 701, which may indicate an address ranging up to a buffer entry address value 802. Tail pointer value 1 803, tail pointer value 2 804, through tail pointer value N 805 within tail pointers 704 each indicate the next buffer entry from which data should be read by a respective one of the circular buffer readers 705. Address 802, which indicates the legal write range for circular buffer writer 701, may have a value up to and including MIN(Tail Pointer 1, Tail Pointer 2, . . . , Tail Pointer N)+Buffer Size, where Buffer Size is based on the number of entries within the circular buffer 702. Address ranges 807, 808, and 809 indicate the legal read range for circular buffer reader 1, circular buffer reader 2, . . . , circular buffer reader N, respectively, within circular buffer readers 705. Each of circular buffer readers 705 may read data from any location that is less than the head pointer value 801 and greater than or equal to its respective tail pointer value 803, 804 or 805. The circular buffer writer 701 may write data to locations greater than or equal to the head pointer value 801 and less than a value 802 based on the sum of the buffer size and the lowest (minimum) of all tail pointers 803-805.

Figure 9:
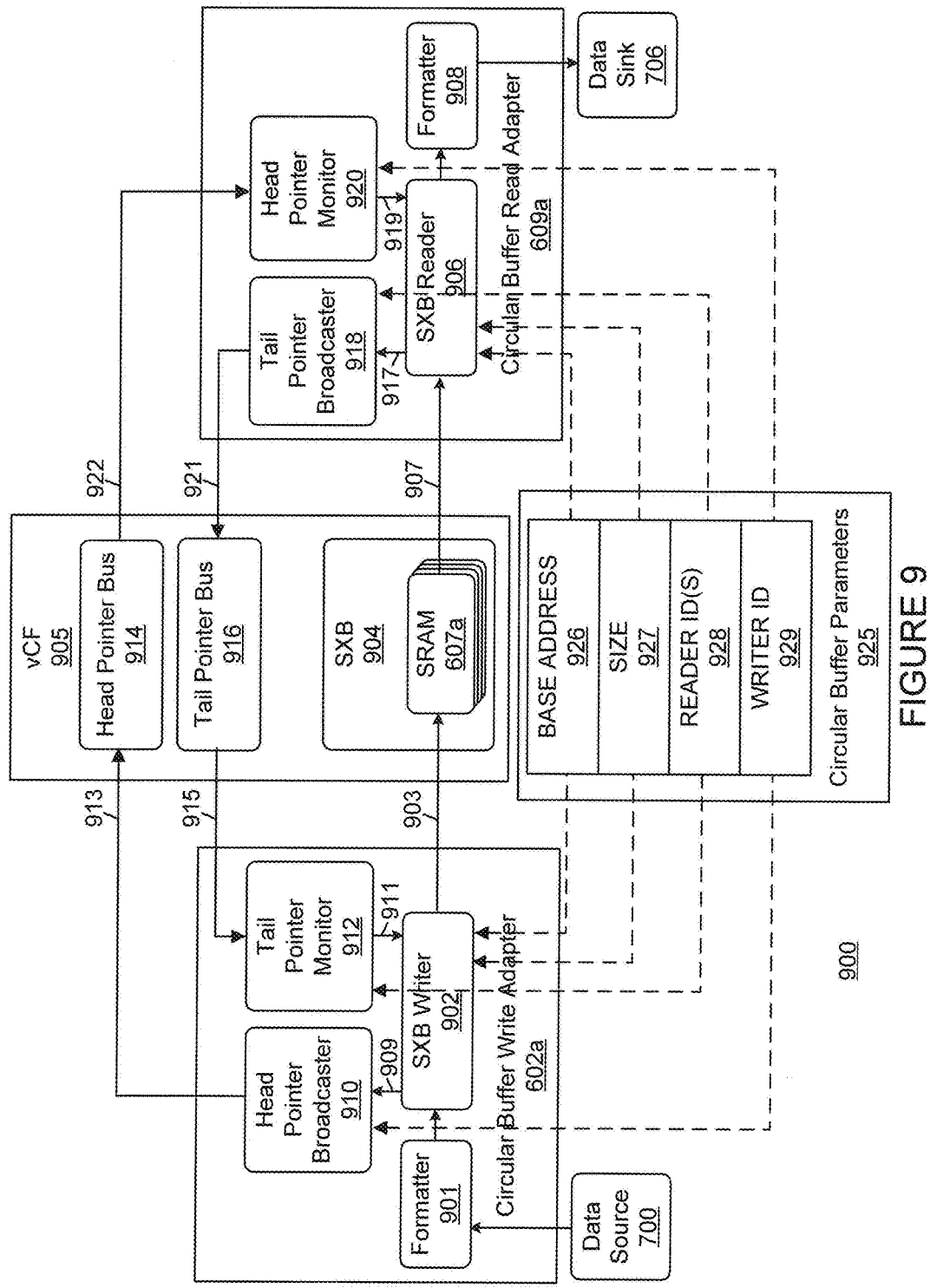
FIG. 9 is a high level block diagram illustrating synchronization of head pointer and tail pointers between the circular buffer writer and circular buffer readers employed as part of the hardware architecture for acceleration of computer vision and imaging processing in accordance with an embodiment of the present disclosure.

FIG. 9 is a high level block diagram illustrating synchronization of head pointer and tail pointers between the circular buffer writer and circular buffer readers employed as part of the hardware architecture for acceleration of computer vision and imaging processing in accordance with an embodiment of the present disclosure. The functional components 900 illustrated in FIG. 9 operate between a data source 700 and one of the data sink(s) 706 using one of the circular buffer write adapters 602a and one of the circular buffer read adapters 609a. Each of the circular buffer write adapters 602a to 602n in FIGS. 6A-6C may have the structure depicted for circular buffer write adapter 602a in FIG. 9. Likewise each of the circular buffer read adapters 609a to 609n in FIGS. 6A-6C may have the structure depicted for circular buffer read adapter 609a in FIG. 9. The example depicted in FIG. 9 includes a single circular buffer writer represented by circular buffer write adapter 602a and a single circular buffer reader represented by circular buffer read adapter 609a. In alternate embodiments described in further detail below, however, the synchronization scheme depicted in FIG. 9 may be implemented with a single circular buffer writer and multiple circular buffer readers. Complex flow control is not required for either configuration of the synchronization scheme depicted.

Circular buffer write adapter 602a includes a formatter 901 for converting received image data from a stream format in which the image data is streamed from the data source 700 to the circular buffer write adapter 602a into a format employed for the circular buffer. A sparse crossbar (SXB) writer 902 receives the formatted image data from the formatter 901 and writes the circular buffer-formatted image data as part of write data 903 to an SXB 904 within the vision Chaining Fabric (vCF) 905 of the present disclosure. The SXB 904 serves read requests from an SXB reader 906, providing circular buffer-formatted image data as part of read data 907. The SXB 904 has fewer switches than a full crossbar would employ to couple any of m inputs to any of n≥m outputs, and couples both the circular buffer write adapter 602a and the circular buffer read adapter 609a to the SRAMs 607a-607x. That is, the SXB 904 does not provide connections for each of the m inputs to each and every one of the n outputs, but instead provides connections from each of the m inputs to a selected subset of the n outputs (which has the effect of also providing connections from a selected subset of the m inputs to each of the n outputs). In that respect, the SXB 904 provides the functionality of write matrix 606 and read matrix 608 in FIGS. 6A-6C. The SXB reader 906 provides circular buffer-formatted image data to a formatter 908 within the circular buffer read adapter 609a, which converts the image data from the format employed by the circular buffer to a stream format in which the image data is streamed to the data source 706.

As the SXB writer 902 transmits formatted image data to the SXB 904, the SXB writer 902 signals the current head pointer value 801 via progress update(s) 909 to a head pointer broadcaster 910 within the circular buffer write adapter 602a. The SXB writer 902 also receives stall signal 911 based on updates for the current tail pointer value 803 from a tail pointer monitor 911 within the circular buffer write adapter 602a. The current head pointer value 801 is transmitted in a head pointer broadcast request 913 by head pointer broadcaster 910 to a head pointer bus 914 in vCF 905, which forms part of the write status bus 603 in FIGS. 6A-6C. The current tail pointer value 803 is received by the tail pointer monitor 912 within a tail pointer broadcast 915 from a tail pointer bus 916, which forms part of the read status bus 604 in FIGS. 6A-6C.

In similar fashion, as the SXB reader 906 receives formatted image data from the SXB 904, the SXB reader 906 signals the current tail pointer value 803 via progress update(s) 917 to a tail pointer broadcaster 918 within the circular buffer read adapter 609a. The SXB reader 906 also receives stall signal 919 based on updates for the current head pointer value 801 from a head pointer monitor 920 within the circular buffer read adapter 609a. The current tail pointer value 803 is transmitted in a tail pointer broadcast request 921 by tail pointer broadcaster 918 to the tail pointer bus 916, and the current head pointer value 801 is received by the head pointer monitor 920 within a head pointer broadcast 922 from the head pointer bus 914.

The SXB writer 902 and the SXB reader 906 are each programmed with the circular buffer parameters 925. The circular buffer parameters 925 are employed during operation of vCF 905 as described herein, but (as depicted) are not necessarily set or changed by the vCF 905, but instead may be set or changed by a controller. The parameters BASE ADDRESS 926 and SIZE 927 specify the physical address range of the circular buffer within the multi-bank memory sub-system including SRAMs 607a-607x. READER ID(s) 928 and WRITER ID 929 are used to identify the origin of messages broadcast on the head pointer bus 914 and tail pointer bus 916. Head pointer 801 is updated by the SXB writer 902 and mirrored by a head pointer copy register (not shown in FIG. 9) in each of the SXB readers 906. The head pointer copy register is updated only when the writer broadcasts an updated head pointer 801. Tail pointer 803 or, in the case of multiple circular buffer readers, tail pointers 803, 804, and 805 are updated by the SXB reader(s) 906 and mirrored by corresponding tail pointer copy register(s) (also not shown in FIG. 9) in the SXB writer 902. The tail pointer copy register(s) are updated only when the corresponding SXB reader 906 broadcasts an updated tail pointer 803. Due to the limited frequency and latency of the head pointer/tail pointer broadcasts, the copies within the respective head pointer copy register and tail pointer copy register(s) may be outdated compared to the "original" or most recently updated value. Because the head pointer 801 and the tail pointer(s) 803, 804, 805 are monotonously increasing, however, the delay does not affect the integrity of the circular buffer.

Figure 10:
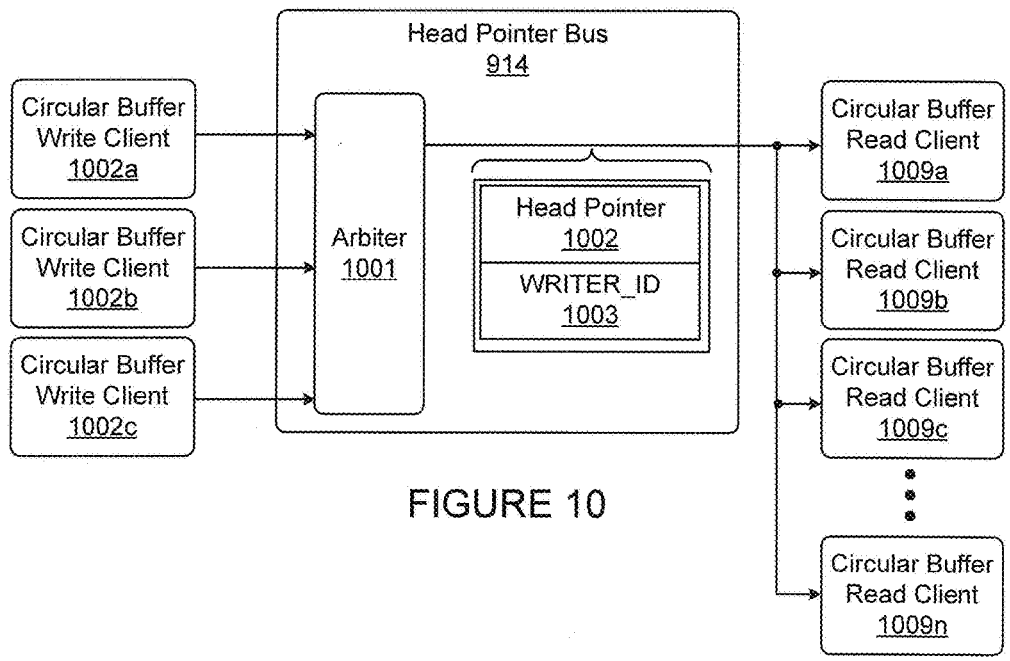
FIG. 10 is a block diagram of the head pointer bus in accordance with an embodiment of the present disclosure.

FIG. 10 is a block diagram of the head pointer bus in accordance with an embodiment of the present disclosure. Three circular buffer write clients and four circular buffer read clients are depicted in the example shown, although the head pointer bus 914 may operate with different permutations of numbers of m circular buffer write clients and n circular buffer read clients. The head pointer bus 914 is a low-overhead, low-latency interconnect dedicated for sending head pointer information from circular buffer write clients 1002a, 1002b and 1002c (each of which include a respective one of circular buffer write adapter 602a, 602b and 602c) to circular buffer read clients 1009a, 1009b, 1009c and 1009n (each of which include a respective one of circular buffer read adapter 609a, 609b, 609c and 602n). The head pointer bus 914 includes a head pointer bus arbiter 1001 performing round-robin arbitration between requests from circular buffer write clients 1002a, 1002b and 1002c. Under the control of arbiter 1001, the head pointer bus 914 broadcasts, to circular buffer read clients 1009a, 1009b, 1009c and 1009n, head pointer information received from one of the circular buffer write clients 1002a, 1002b and 1002c. The information broadcast by head pointer bus 914 includes at least the head pointer 1005, a 32 bit number that indicates write progress of one of circular buffer write clients 1002a, 1002b or 1002c, and a WRITER ID 1003, an 8 bit number that indicates the circular buffer context of the respective one of circular buffer write clients 1002a, 1002b or 1002c. The head pointer bus 914 has a throughput of 1 broadcast per system clock cycle.

To support the case of unknown length transfers, the head pointer bus 914 may also carry premature stream termination information generated by a write adapter, even though not all read adapter implementations will necessarily use that information to prematurely stop a stream. That feature is useful in vision and imaging applications since the length of some data streams generated during the course of processing are data dependent (e.g., based on the number of features from an image).

Figure 11:
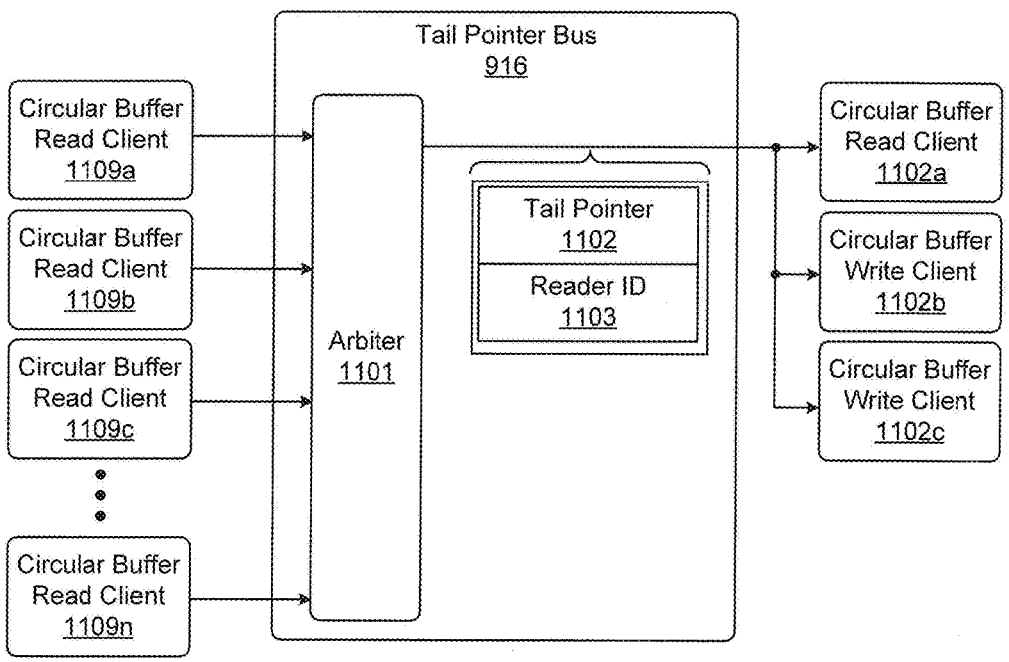
FIG. 11 is a block diagram of the tail pointer bus in accordance with an embodiment of the present disclosure.

FIG. 11 is a block diagram of the tail pointer bus in accordance with an embodiment of the present disclosure. Three circular buffer write clients and four circular buffer read clients are depicted in the example shown, although the tail pointer bus 916 may operate with different permutations of numbers of m circular buffer write clients and n circular buffer read clients. The tail pointer bus 916 is a low-overhead, low-latency interconnect dedicated for sending tail pointer information from circular buffer read clients 1109a, 1109b, 1109c and 1109n (each of which include a respective one of circular buffer read adapter 609a, 609b, 609c and 602n) to circular buffer write clients 1102a, 1102b and 1102c (each of which include a respective one of circular buffer write adapter 602a, 602b and 602c). The tail pointer bus 916 includes a tail pointer bus arbiter 1101 performing round-robin arbitration between requests from circular buffer read clients 1109a, 1109b, 1109c and 1109n. Under the control of arbiter 1101, the tail pointer bus 916 broadcasts tail pointer information received from one of the circular buffer read clients 1109a, 1109b, 1109c and 1109n to the circular buffer write clients 1102a, 1102b and 1102c. The information broadcast by the tail pointer bus 916 includes at least the tail pointer 1102, a 32 bit integer that indicates read progress of the respective one of circular buffer read clients 1109a, 1109b, 1109c and 1109n, and a reader ID, an 8 bit integer that indicates the circular buffer context of the respective one of circular buffer read clients 1109a, 1109b, 1109c and 1109n. The tail pointer bus 916 has a throughput of 1 broadcast per system clock cycle.

The head pointer bus 914 and the tail pointer bus 916 could be implemented as a single bus, rather than as two independent buses. However, such combined implementation could negatively impact performance due to higher congestion, and would likely require more area due to more complex arbitration requirements.

Figure 12A:
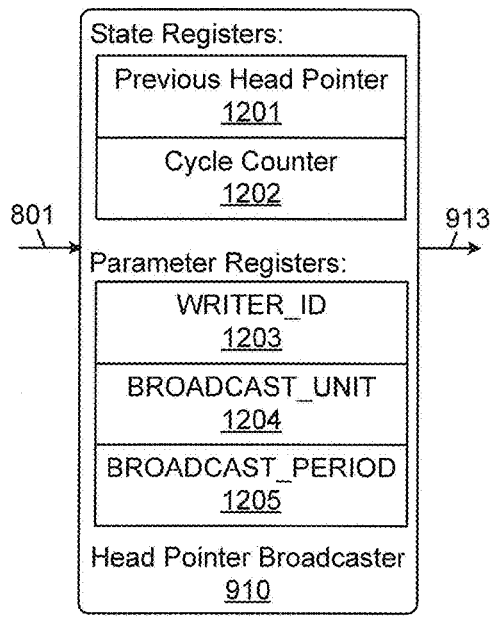
FIGS. 12A and 12B are a high level block diagram and a high level flow diagram, respectively, for head pointer broadcast rate control in accordance with an embodiment of the present disclosure.
Figure 12B:
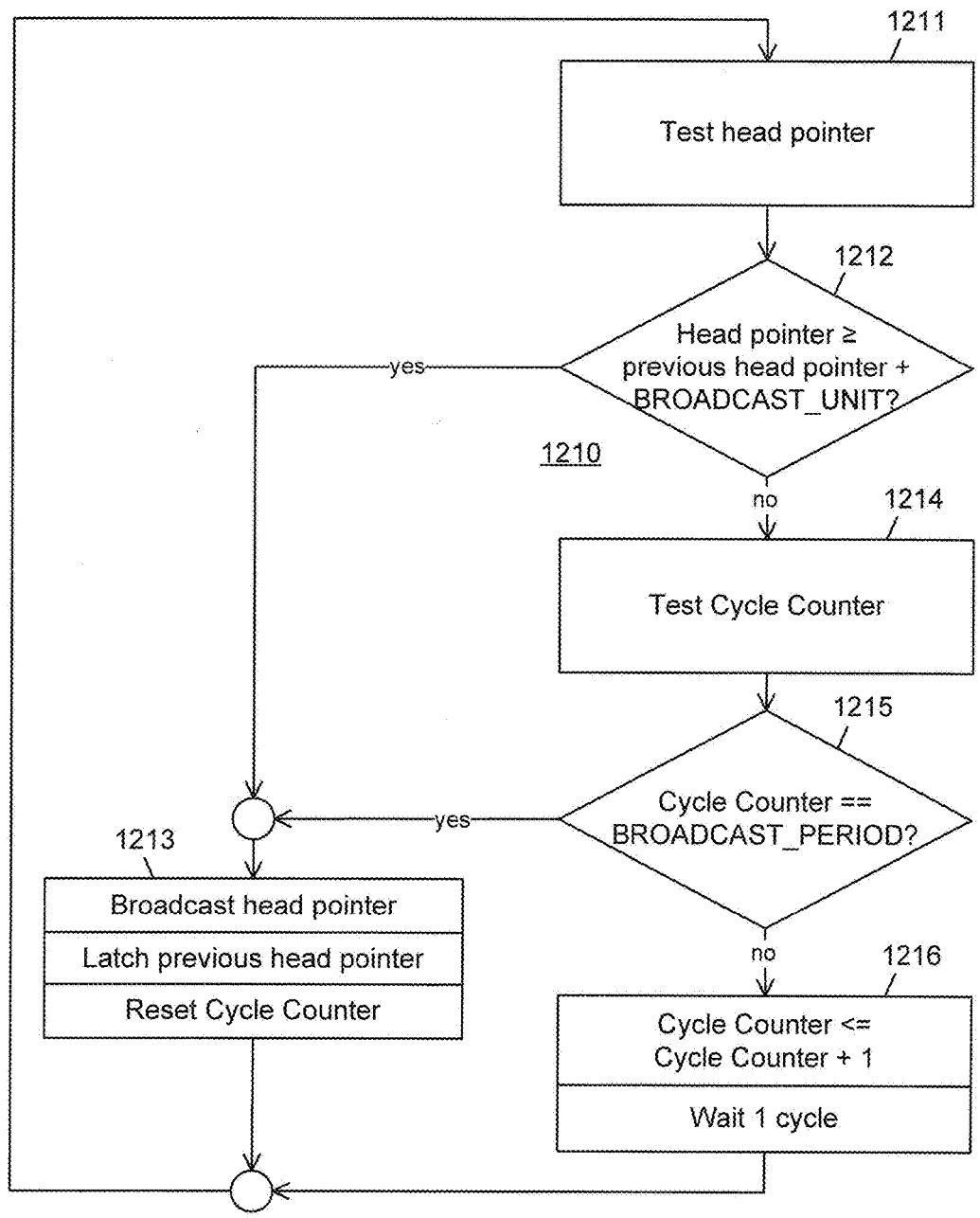

FIGS. 12A and 12B are a high level block diagram and a high level flow diagram, respectively, for head pointer broadcast rate control in accordance with an embodiment of the present disclosure. As shown in FIG. 12A, head pointer broadcaster 910 receives updates for the head pointer 801 from the SXB writer and transmits head pointer broadcast requests 913 to the head pointer bus. Head pointer broadcaster 910 includes two state registers: a previous head pointer register 1201 storing the starting address value for the last-written buffer entry and a cycle counter 1202 storing a number of system clock cycles since the head pointer value was last updated. Head pointer broadcaster 910 also includes three parameter registers: a WRITER_ID register 1203 programmed by the host system to store the writer identifier for the circular buffer write client that wrote image data to the last-written buffer entry, a BROADCAST_UNIT register 1204 storing a configurable size or width of buffer entries (including the last-written buffer entry), and a BROADCAST_PERIOD register 1205 storing a configurable maximum number of system clock cycles expected to elapse before the head pointer is updated.

As illustrated in FIG. 12B, the process 1210 executed by head pointer broadcaster 910 begins with testing of a current head pointer (step 1211) received in a progress update from the SXB writer. If the current head pointer is greater than or equal to the value of the previous head pointer plus the BROADCAST_UNIT parameter (step 1212), then (a) the head pointer broadcaster 910 transmits a request to broadcast the new head pointer to the head pointer bus, (b) the new head pointer value is latched into the previous head pointer register 1201, and (c) the cycle counter register 1202 is reset (collectively step 1213). If the current head pointer is not greater than or equal to the value of the previous head pointer plus the BROADCAST_UNIT parameter (step 1212), the value in the cycle counter register 1202 is tested (step 1214). If the cycle counter is equal to the BROADCAST_PERIOD parameter (step 1215), then (a) the head pointer broadcaster 910 transmits a request to broadcast the new head pointer to the head pointer bus, (b) the new head pointer value is latched into the previous head pointer register 1201, and (c) the cycle counter register 1202 is reset (collectively step 1213). If the cycle counter is not equal to the BROADCAST_PERIOD parameter (step 1215), the value in the cycle counter register 1203 is incremented and the process 1210 waits for a clock cycle (collectively step 1216) before restarting (step 1211). In this manner, the rate of head pointer broadcasts is controlled by two configurable parameters that may be programmed by the host system: BROADCAST_UNIT and BROADCAST_PERIOD.

Figure 13A:
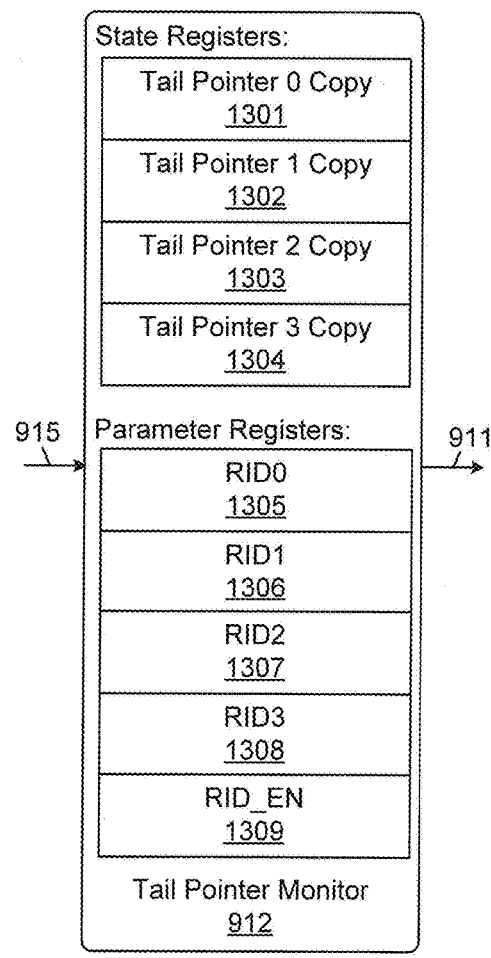
FIGS. 13A and 13B are a high level block diagram and a high level circuit diagram, respectively, for tail pointer updates in accordance with an embodiment of the present disclosure.
Figure 13B:
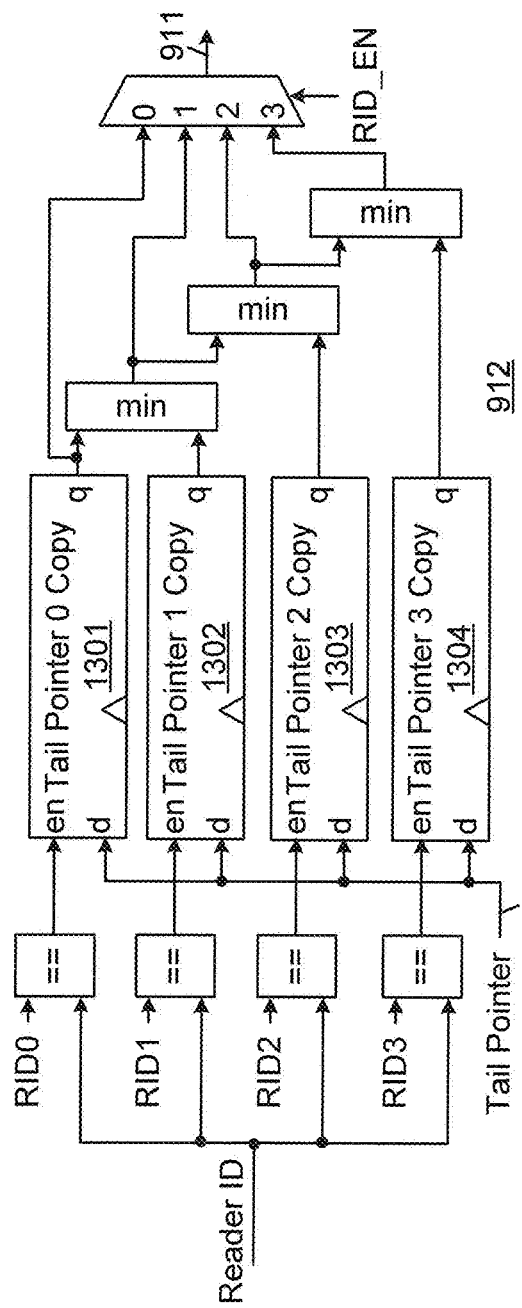

FIGS. 13A and 13B are a high level block diagram and a high level circuit diagram, respectively, for tail pointer updates in accordance with an embodiment of the present disclosure. Tail pointers broadcast on the tail pointer bus from circular buffer read clients may be latched in the tail pointer monitor 912, with the reader identifier (ID) of the tail pointer bus broadcast compared to a programmable number of stored reader IDs so that a match results in the tail pointer of the tail pointer bus broadcast being stored in the register corresponding to the matched reader ID. The effective tail pointer for the purpose of flow-controlling the circular buffer write client is the minimum of the tail pointers received from each of the circular buffer read clients.

In the example shown, the tail pointer monitor 912 is configurable to monitor up to four tail pointers, each coming from a different circular buffer read client. Accordingly, the tail pointer monitor 912 depicted in FIG. 13A includes four state registers 1301, 1302, 1303 and 1304 for storing copies of tail pointer 0, tail pointer 1, tail pointer 2 and tail pointer 3, respectively. The tail pointer monitor 912 also includes five parameter registers 1305, 1306, 1307, 1308 and 1309. Each of registers 1305, 1306, 1307, and 1308 stores one of the up to four reader identifiers (RIDs), while register 1309 stores a parameter RID_EN specifying the number of circular buffer reader clients to monitor. When operating at capacity of monitoring four tail pointers, registers 1305, 1306, 1307, and 1308 each store, respectively, reader identifier RID0, RID1, RID2 and RID3 corresponding to tail pointer 0, tail pointer 1, tail pointer 2 and tail pointer 3. When RID_EN specifies that fewer than four tail pointers are to be monitored, one or more of registers 1305, 1306, 1307, and 1308 is not used to store a reader identifier.

The tail pointer monitor 912 within a circular buffer write client receives updated tail pointer values within the tail pointer broadcast 915 from the tail pointer bus, and outputs an effective tail pointer within stall signal 911 to the SXB writer. As shown in FIG. 13B, the registers 1301, 1302, 1303, and 1304 may be implemented as D latches each receiving the new tail pointer value received in the tail pointer broadcast 915 at the D input. A reader ID for the circular buffer read client that initiated transmission of the new tail pointer on the tail pointer bus is compared to each of reader identifiers RID0, RID1, RID2 and RID3, with the outputs of the compare units ("=") connected to the enable ("en") input of the corresponding tail pointer latch 1301, 1302, 1303 and 1304. The received reader ID will thus cause the new tail pointer to be latched into the appropriate tail pointer latch 1301, 1302, 1303 and 1304. That is, whenever a reader ID from the tail pointer bus matches the value of one of RID0 through RID3, the new tail pointer value from the tail pointer bus is stored in the corresponding tail pointer copy register 1301, 1302, 1303 or 1304. The reader ID is thus used to latch only those broadcasts originating from the same circular buffer context.

At the outputs of the tail pointer latches 1301, 1302, 1303 and 1304, a cascaded set of minimum value comparators ("min") are arranged so that one receives the outputs of two of the tail pointer latches 1301 and 1302 while the remainder each receives the outputs of a lower minimum value comparator and the output of another of the tail pointer latches 1303 or 1304. The output of the lowest tail pointer latch 1304 and the outputs of each of the minimum value comparators are received as inputs at a multiplexer, which outputs the effective tail pointer under the control of RID_EN. The output to the SXB writer in stall signal 911 is thus the lowest-valued of the tail pointers in tail pointer latches 1301, 1302, 1303 and 1304. The effective tail pointer is the minimum value of all enabled tail pointer copy registers 1301, 1302, 1303 and 1304.

Referring back to FIG. 9, the interaction between components of vCF 905 during basic operation is illustrated. Before a transfer through a circular buffer begins, circular buffer write clients and circular buffer read clients are configured by a controller with the circular buffer parameters 925 (BASE ADDRESS 926, SIZE 927, WRITER ID 929 and, assuming the single circular buffer reader implementation, READER ID 928). The circular buffer write client's SXB writer 502 writes data into SRAM memories 607a-607x via the SXB 904. The SXB writer 902 writes to a physical memory region between BASE ADDRESS 926 and BASE ADDRESS 926 plus SIZE 927. Upon a successful write, the head pointer 801 is updated and the head pointer broadcaster 910 is notified of the updated head pointer value. The circular buffer's tail pointer 803 from the tail pointer monitor 912 is used to stall writes that are outside of the legal or valid range defined by the tail pointer 803. Stalled writes are resumed once a change in the tail pointer 803 puts the write within the valid range.

The circular buffer write client's head pointer broadcaster 910 requests the broadcast of the updated head pointer value on the head pointer bus 914. Broadcasts are tagged with WRITER_ID 929 to indicate the appropriate circular buffer context. Head pointer broadcast requests 913 are triggered by pre-programmed thresholds for one of the number of cycles between broadcasts (BROADCAST_PERIOD) and the interval of the head pointer value between broadcasts (BROADCAST_UNIT).

The circular buffer write client's tail pointer monitor 912 receives tail pointer updates from the tail pointer bus 916. The Reader ID associated with a tail pointer is used to latch only those broadcasts originating from the same circular buffer context. Tail pointers from up to 4 circular buffer read clients may be latched within the tail pointer monitor 912 of the exemplary embodiment, with the Reader ID on a tail pointer bus broadcast compared with up to 4 programmable reader IDs and, if a match is determined, the tail pointer of the tail pointer bus broadcast stored in the register corresponding to the matched Reader ID. The effective tail pointer for purposes of flow-controlling the circular buffer write client is the minimum of the tail pointers received from each of the circular buffer read clients.

Each circular buffer read client's SXB reader 906 reads data from SRAM memories 607a-607x via the sparse crossbar 904. Reads are performed from a physical memory region between BASE ADDRESS and BASE ADDRESS+ SIZE. Once a memory region is consumed, the tail pointer for the respective circular buffer read client is updated and the tail pointer broadcaster 918 is notified of the updated tail pointer value. The head pointer from the head pointer monitor 920 is used to stall reads that are outside of the valid range defined by the head pointer. Stalled reads are resumed once a change in the head pointer puts the read within the valid range.

Each circular buffer read client's tail pointer broadcaster 918 requests broadcast of tail pointer updates on the tail pointer bus 916. Broadcasts are tagged with the respective Reader ID for the circular buffer read client to indicate the correct circular buffer context. Requests are triggered by pre-programmed thresholds for one of the number of cycles between broadcasts (BROADCAST_PERIOD) and the interval of the tail pointer value between broadcasts (BROADCAST_UNIT). Each circular buffer read client's head pointer monitor 920 receives head pointer updates from the head pointer bus 914. WRITER_ID is used to latch only those broadcasts originating from the same circular buffer context as the respective circular buffer read client.

Figure 14A:
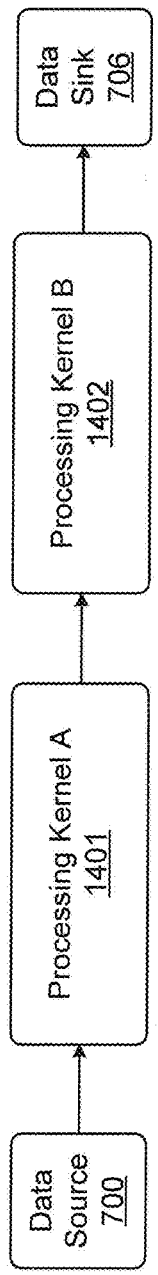
FIGS. 14A and 14B are a logical diagram and a flow diagram, respectively, for chaining multiple hardware accelerators in sequence using the hardware architecture for acceleration of computer vision and imaging processing in accordance with an embodiment of the present disclosure.
Figure 14B:
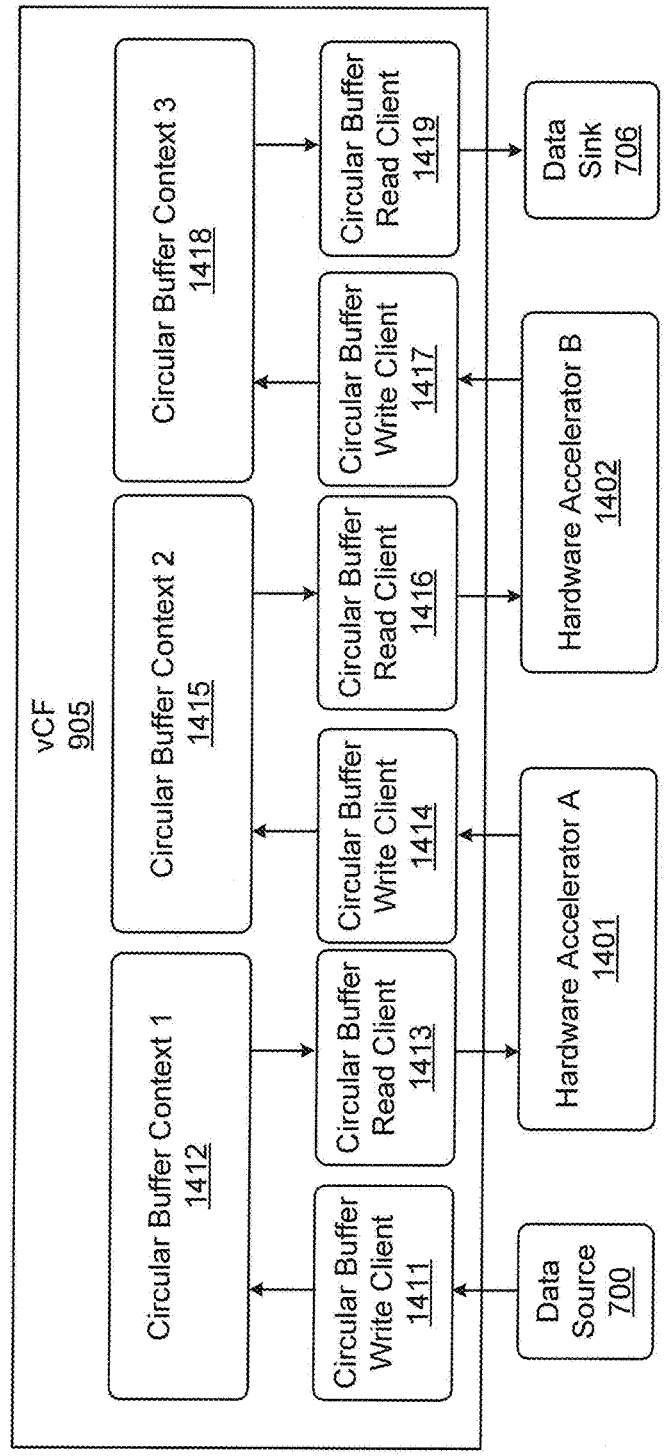

Among the applications for the circular buffer/streaming interconnect of the vCF 900 in imaging and computer vision use cases are chaining of multiple hardware accelerators in sequence, chaining one data source to two data sinks, and pipelining circular buffer contexts. FIGS. 14A and 14B are a logical diagram and a programming model diagram, respectively, for chaining multiple hardware accelerators in sequence using the hardware architecture for acceleration of computer vision and imaging processing in accordance with an embodiment of the present disclosure. Many computer vision applications require the chaining of two or more processing kernels—for example, a Gaussian blur kernel may be followed by a downscaling kernel. FIG. 14A is a diagram of the logical data flow for a processing graph 1400 that consists of two processing kernels, processing kernel A 1401 and processing kernel B 1402, chained together. The data source 700 and data sink 706 shown may be additional processing kernels, or direct memory access (DMA) units. This kind of chain can be implemented in the vCF 900 by instantiating multiple circular buffer contexts. FIG. 14B is a data flow diagram for a processing graph 1410 including data source 700, processing kernel A 1401, processing kernel B 1402 and data sink 706 implemented using the vCF 900 for data transfers. Three different circular buffer contexts are created to achieve streaming between multiple kernels. Data source 700 is connected to circular buffer write client 1411, which is in turn connected to circular buffer context 1 1412. Circular buffer read client 1413 couples circular buffer context 1 1412 to processing kernel A 1401. Processing kernel A 1401 is connected to circular buffer write client 1414, which is in turn connected to circular buffer context 2 1415. Circular buffer read client 1416 couples circular buffer context 2 1415 to processing kernel B 1402. Processing kernel B 1402 is connected to circular buffer write client 1417, which is in turn connected to circular buffer context 3 1418. Circular buffer read client 1019 couples circular buffer context 3 1418 to data sink 706. Each circular buffer context (circular buffer context 1 1412, circular buffer context 2 1415, and circular buffer context 3 1418 in the example depicted) is assigned a non-overlapping SRAM memory range, a unique Reader ID, and a unique WRITER ID. The processing graph 1410 is thus configured to operate by data streaming through vCF 900.

Figure 15A:
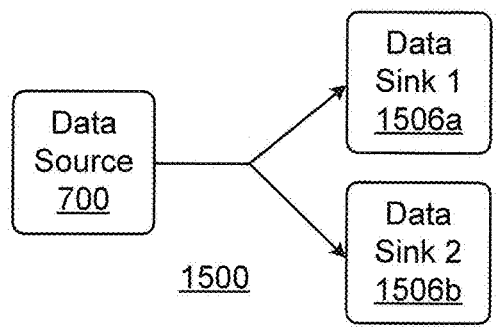
FIGS. 15A, 15B and 15C are a logical diagram, a programming model diagram, and a flow diagram, respectively, for streaming from one data source to multiple data sinks using the hardware architecture for acceleration of computer vision and imaging processing in accordance with an embodiment of the present disclosure.
Figure 15B:
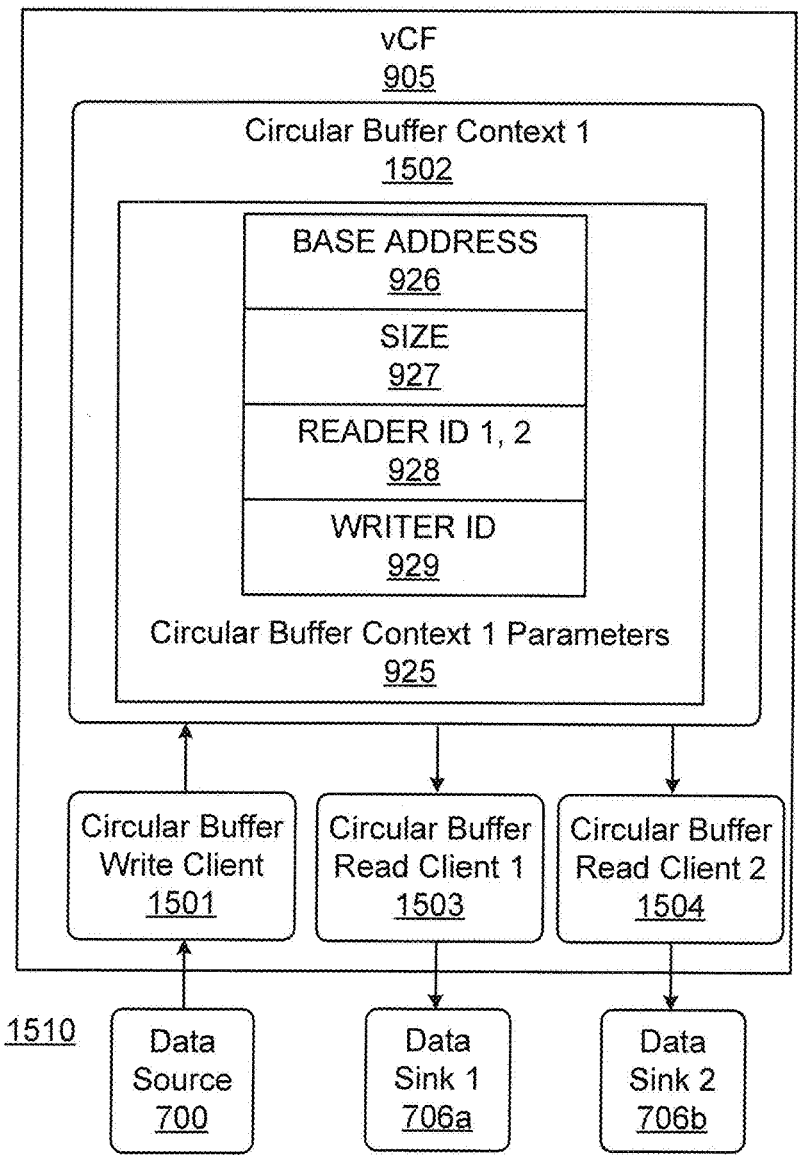
Figure 15C:
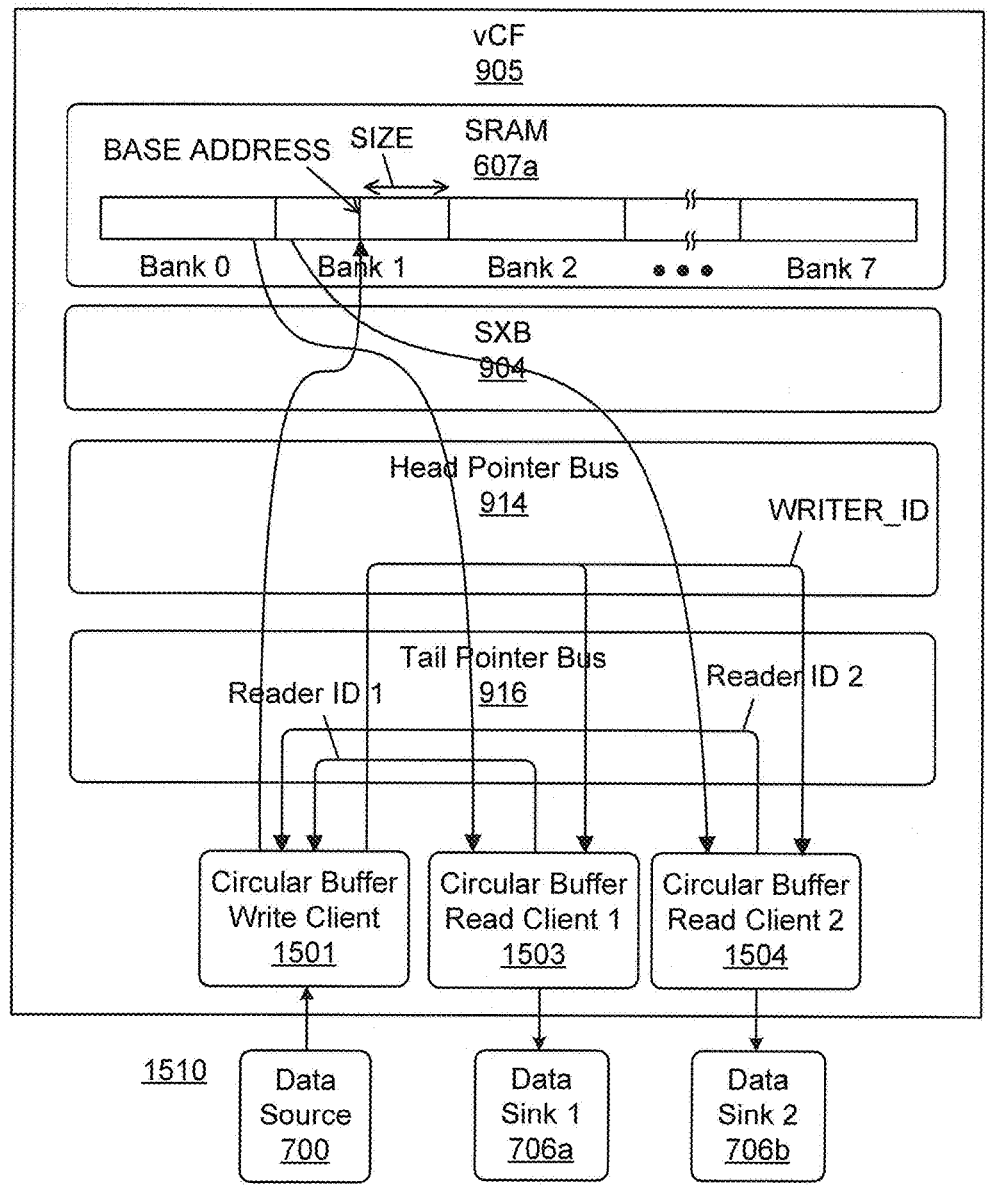

FIGS. 15A, 15B and 15C are a logical diagram, a programming model diagram, and a flow diagram, respectively, for streaming from one data source to multiple data sinks using the hardware architecture for acceleration of computer vision and imaging processing in accordance with an embodiment of the present disclosure. FIG. 15A is a diagram of the logical flow for a processing graph 1500 streaming from one data source 700 to two data sinks 706a and 706b. As illustrated in the programming model diagram 1500 of FIG. 15B, streaming from the one data source 700 to multiple data sinks (two data sinks 706a and 706b in the example shown) using the vCF 900 may be achieved with a circular buffer write client 1501 coupled to the data source 700, one circular buffer context 1502 ("Circular Buffer Context 1"), and circular buffer read clients 1503 and 1504 for data sink 1 706a and data sink 2 706b, respectively. As depicted in FIG. 15C, circular buffer read client 1 1503 is assigned reader ID 1 and circular buffer read client 2 1504 is assigned a different reader ID, reader ID 2. Circular buffer read client 1 1503 and circular buffer read client 2 1504 each read from circular buffer context 1 1502 independently, and thus each have their own tail pointers. The circular buffer write client 1501 keeps track of both tail pointers, and progresses its head pointer based on the minimum of the two tail pointers.

Figure 16C:
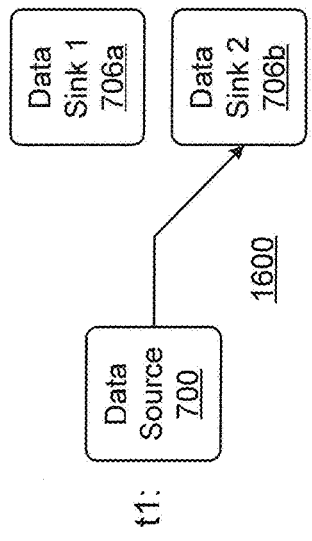
Figure 16D:
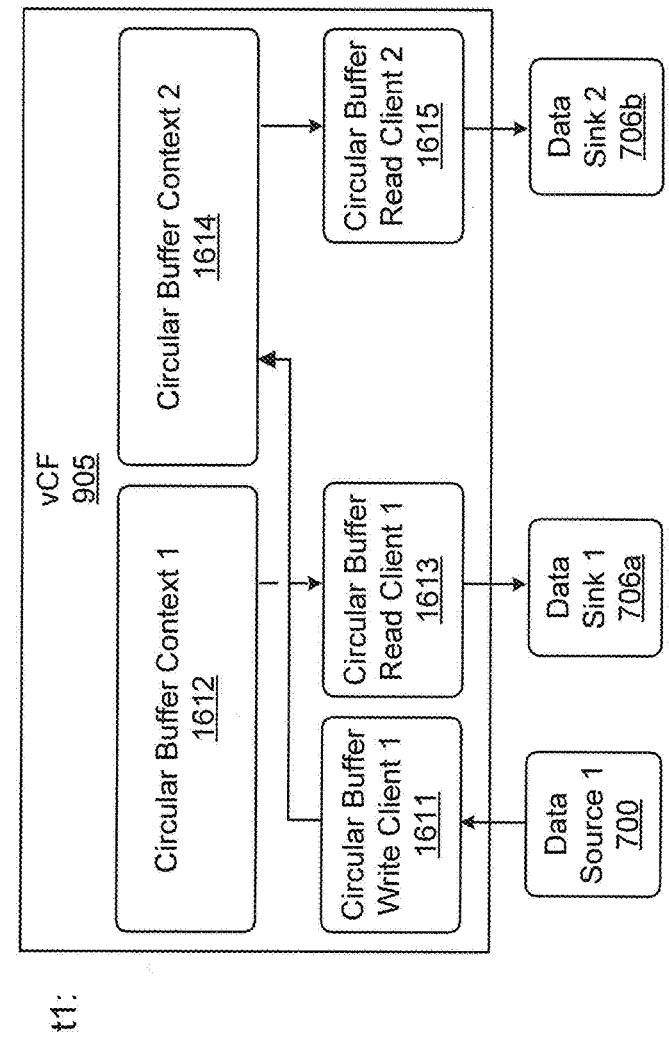

FIGS. 16A, 16B, 16C and 16D are logical diagrams and programming model diagrams for transitioning hardware accelerators between streams using the hardware architecture for acceleration of computer vision and imaging processing in accordance with an embodiment of the present disclosure. FIGS. 16A and 16C are diagrams of the logical flow for a processing graph 1600 in which a single data source 700 streaming to a first data sink 706a at time t0 subsequently switches to streaming to a second data sink 706b at time t1. FIGS. 16B and 16D illustrate the corresponding programming model diagram 1610 at the same times. Two circular buffer contexts 1612 and 1614 are instantiated within vCF 900 to support this use case with minimal control overhead: circular buffer context 1 1612 is used for streaming from data source 1 700 using circular buffer write client 1 1611 to data sink 1 706a via circular buffer read client 1 1613; and circular buffer context 2 1614 is used for streaming from data source 1 700 using circular buffer write client 1 1611 to data sink 2, 706b via circular buffer read client 2 1615. At time to, circular buffer write client 1 1611 (connected to data source 1 700) streams to circular buffer read client 1 1613 (connected to data sink 1 706a). At time t1, circular buffer write client 1 1611 is done writing to circular buffer context 1 1612, but circular buffer read client 1 1613 is not done reading from circular buffer context 1 1612, which may be due to any of a number of reasons (e.g., the data rate data sink 1 706a is lower than the data rate for data source 1 700, data sink 1 is stalled due to an other dependency, etc.). Immediately, without waiting for circular buffer read client 1 1613 to complete reading from circular buffer context 1 1612, circular buffer write client 1 1611 switches to streaming to circular buffer context 2 1614 and is able to stream data to circular buffer read client 2 1615 (connected to data source 2 706b). At any point during the above-described transition, there is no confusion as to whether the head pointer information from circular buffer write client 1 1611 is intended for circular buffer read client 1 1613 or circular buffer read client 2 1615 since the WRITER_ID conveyed together with the head pointer information may be used to distinguish the circular buffer context 1612, 1614 for which the head pointer information is intended.

The particular configurations depicted as instantiated within vCF 900 in FIGS. 14A and 14B, FIGS. 15A, 15B and 15C, and FIGS. 16A, 16B, 16C and 16D may be combined in various permutations to meet the particular needs of a given computer vision and image processing application. Owing to the universalness of circular buffers, the hardware architecture for acceleration of computer vision and imaging processing suits many diverse applications. For example, to effect storage of persistent data in memory (e.g., coefficients), the data may be written once and read multiple times, with the tail pointer never incremented. The vCF 500 may also be configured to support processing in double buffering mode, or tiling of the image data being processed.

Figure 17A:
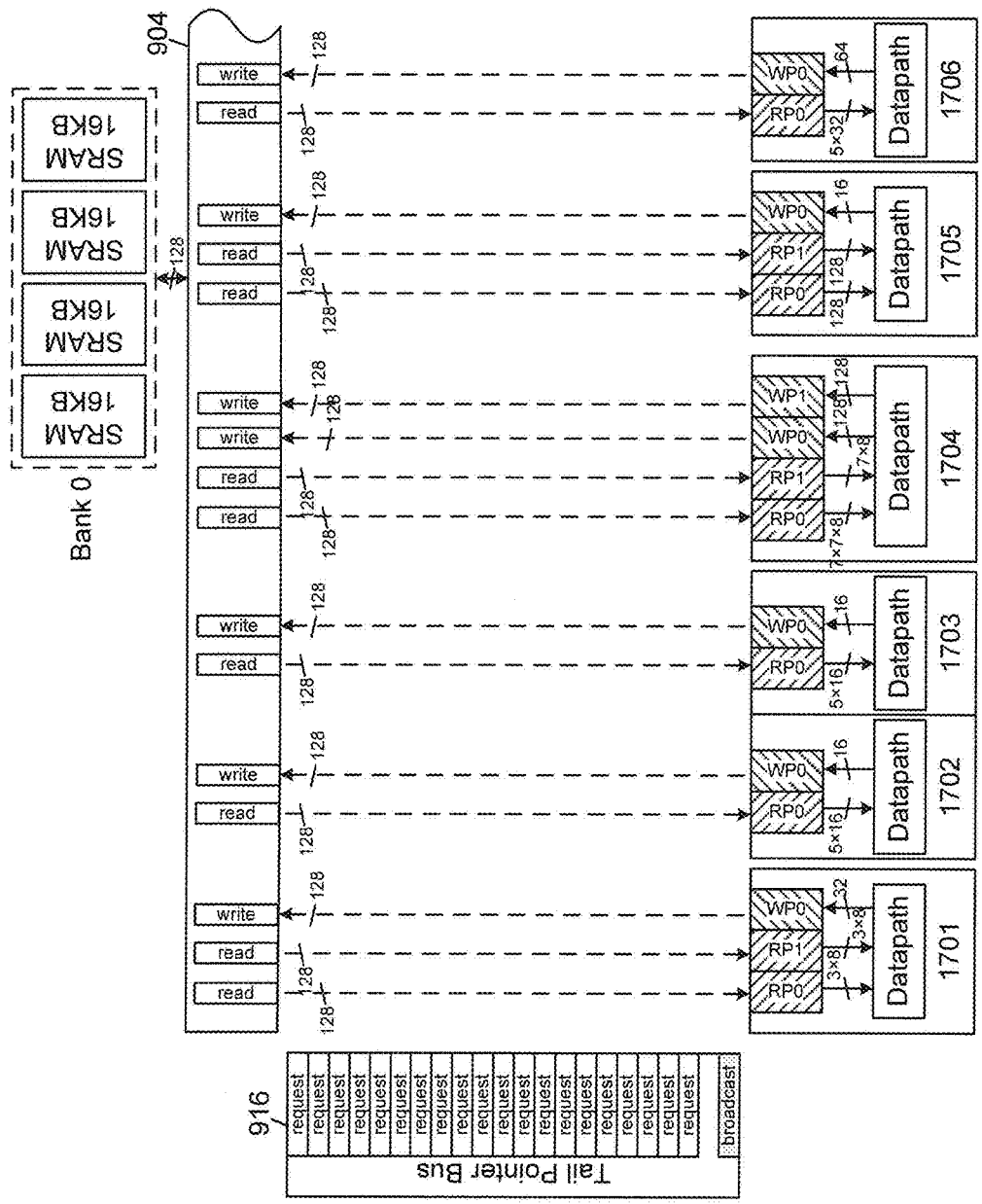
FIGS. 17A through 17I depict an example of a vision Chaining Fabric (vCF) within the hardware architecture for acceleration of computer vision and imaging processing in accordance with an embodiment of the present disclosure.
Figure 17B:
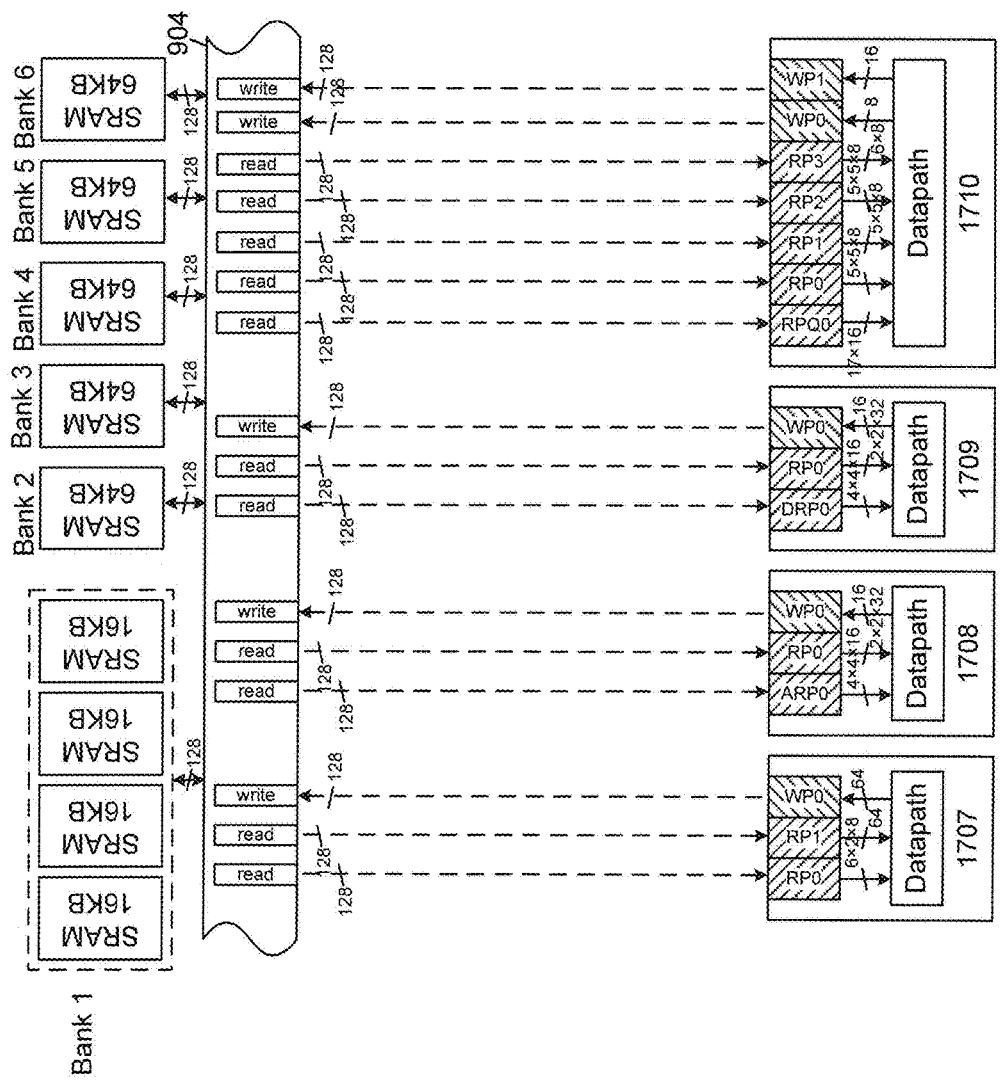
Figure 17C:
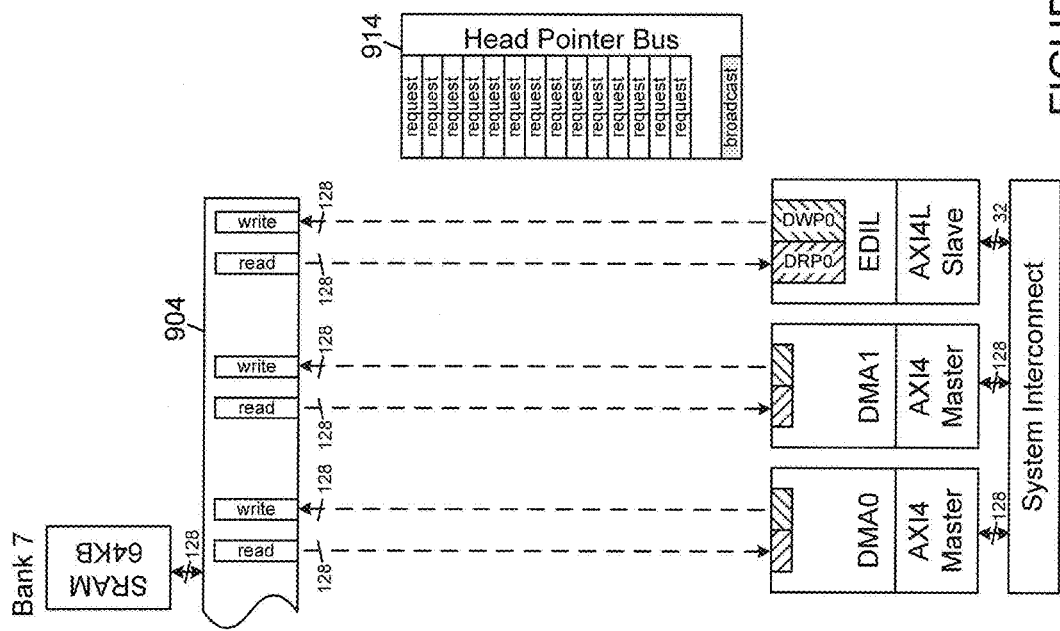
Figure 17D:
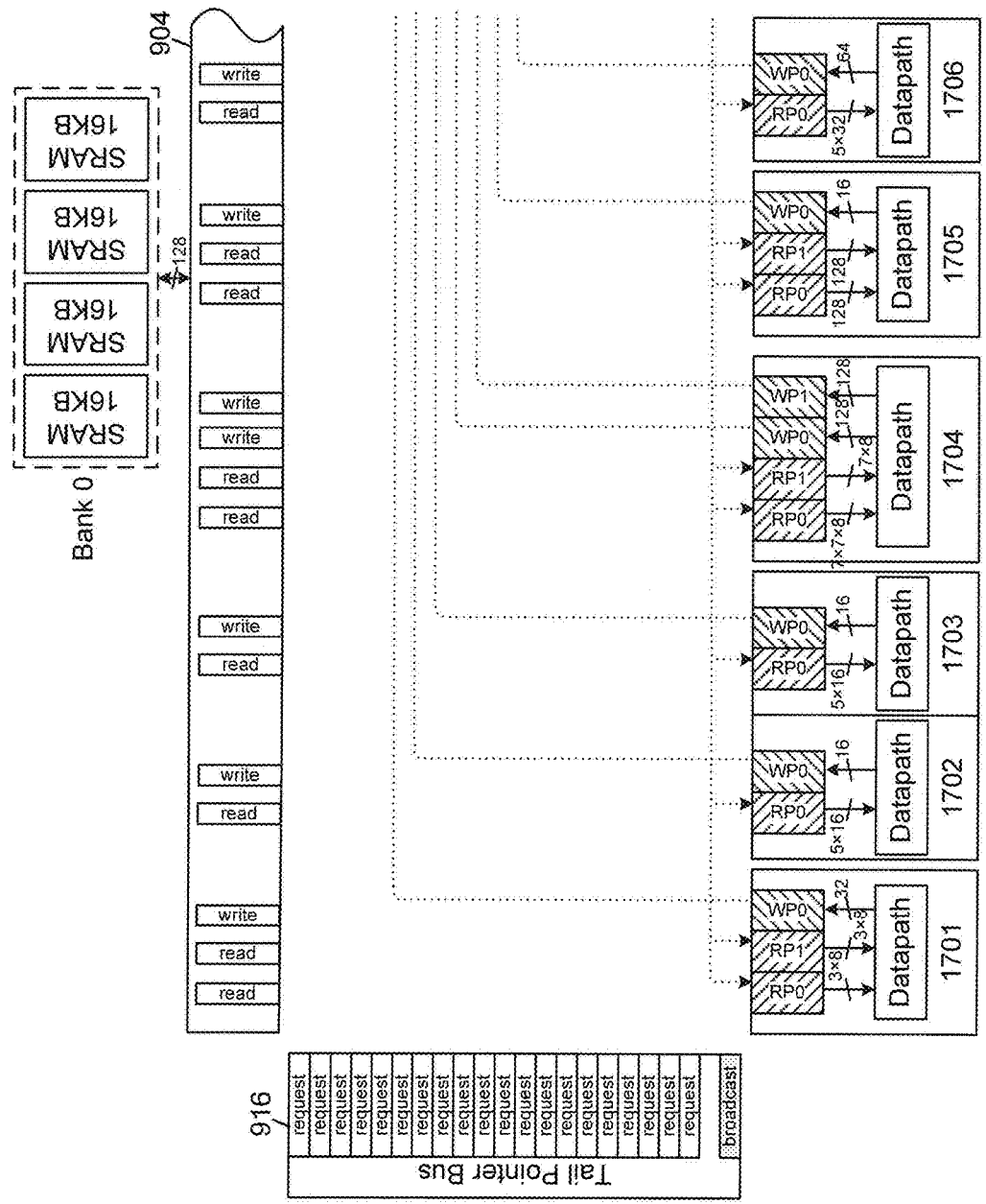
Figure 17E:
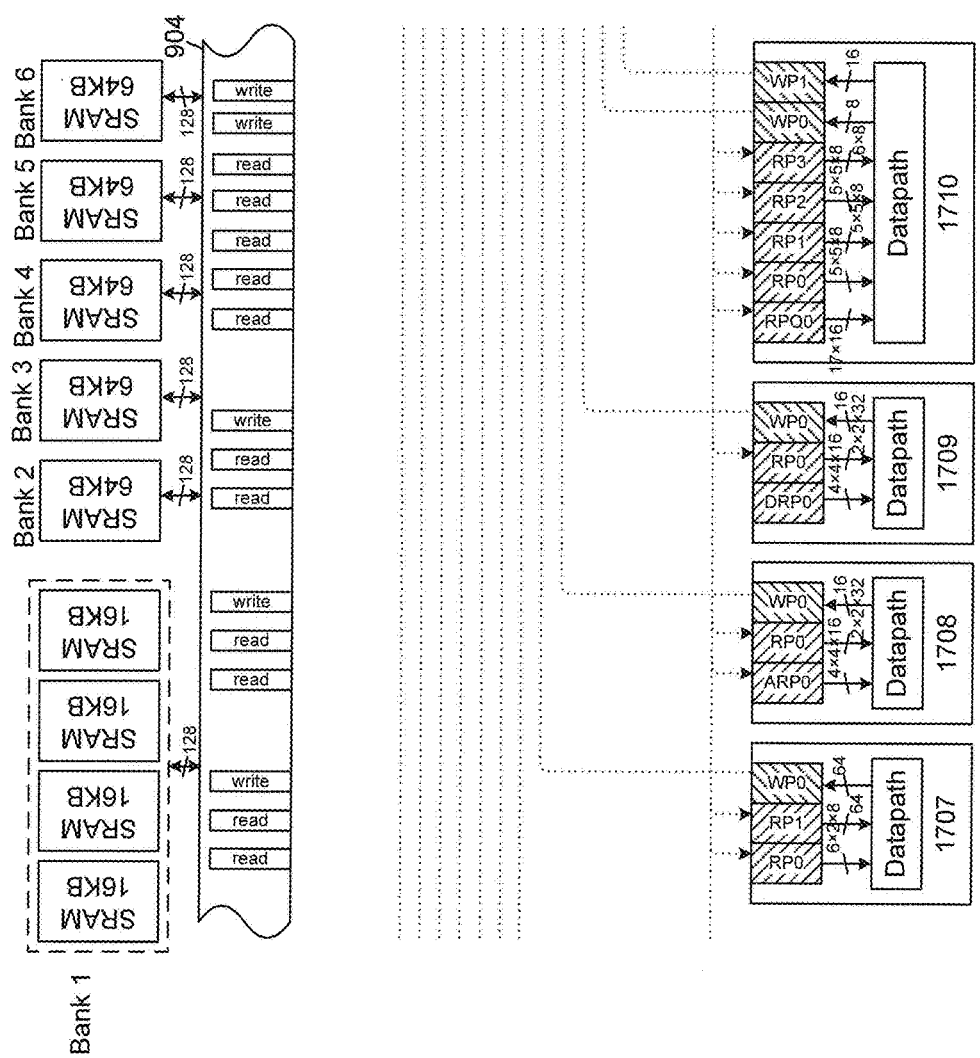
Figure 17F:
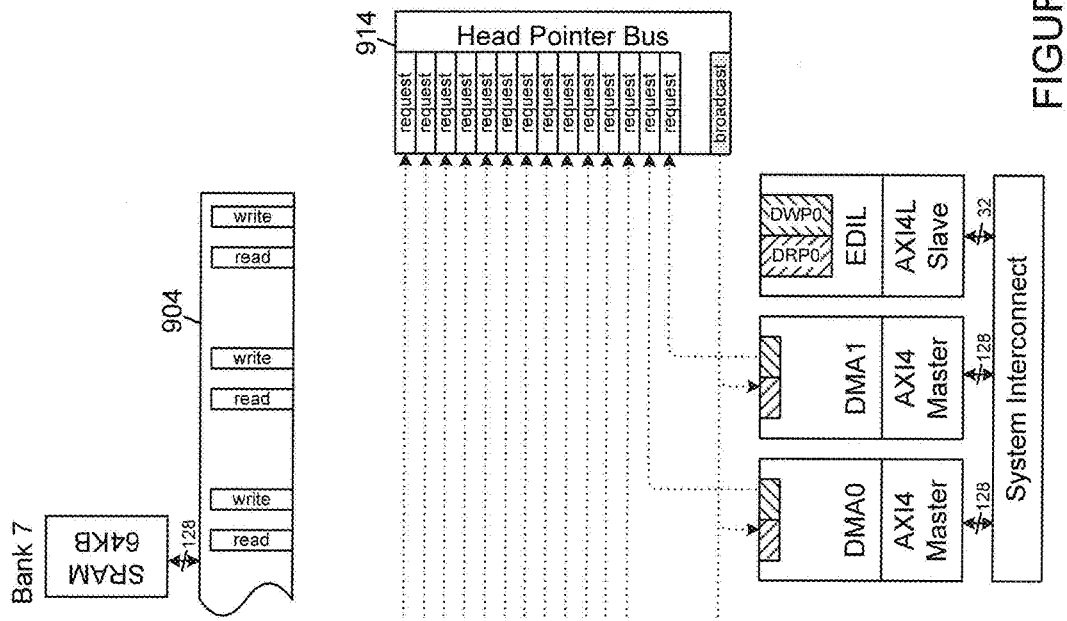

FIGS. 17A through 17I depict an example of a vision Chaining Fabric (vCF) within the hardware architecture for acceleration of computer vision and imaging processing in accordance with an embodiment of the present disclosure. The circular buffer/stream interconnect of the present disclosure is preferably embodied (at least in part) in the vCF, which is integrated inside a mobile device application processor (AP) SoC as a component of the Imaging and Vision Accelerator (IVA). The vCF, circular buffer write clients and circular buffer read clients collectively comprise an embodiment of the circular buffer/streaming interconnect of the present disclosure. FIG. 17A through 17C collectively provide a first view of the vCF, memory and hardware accelerators; FIG. 17D through 17F collectively provide a second view; and FIG. 17G through 17I collectively provide a third view. The three views are provided in order to depict data connections with clarity.

The vCF comprises the SXB 904, the head pointer bus 914 and the tail pointer bus 916, and connects hardware accelerators 1701-1710 to eight banks of SRAM ("Bank 0" through "Bank 7," each of which may be implemented as four 16 KB memories as shown for Bank 0 and Bank 1). The vCF also connects to two DMA interfaces DMA0 and DMA1 that are each coupled, via an Advanced eXtensible Interface (AXI) Interface 4 (AXI4) master, to a system interconnect, as well as to an interface EDIL coupled by an AXI4 Lite (AXI4L) slave to the system interconnect. Buffer read clients (cross-hatched diagonally downward from left to right) are instantiated within hardware accelerators 1701-1710 and data interfaces DMA0, DMA1 and EDIL as one of a read port (RP), an addressed read port (ARP), a read port quad-width (RPQ), and a DMA interface. Buffer write clients (cross-hatched diagonally downward from right to left) are instantiated within the hardware accelerators 1701-1710 and data interfaces DMA0, DMA1 and EDIL as one of a write port (WP) and a DMA interface.

Figure 17G:
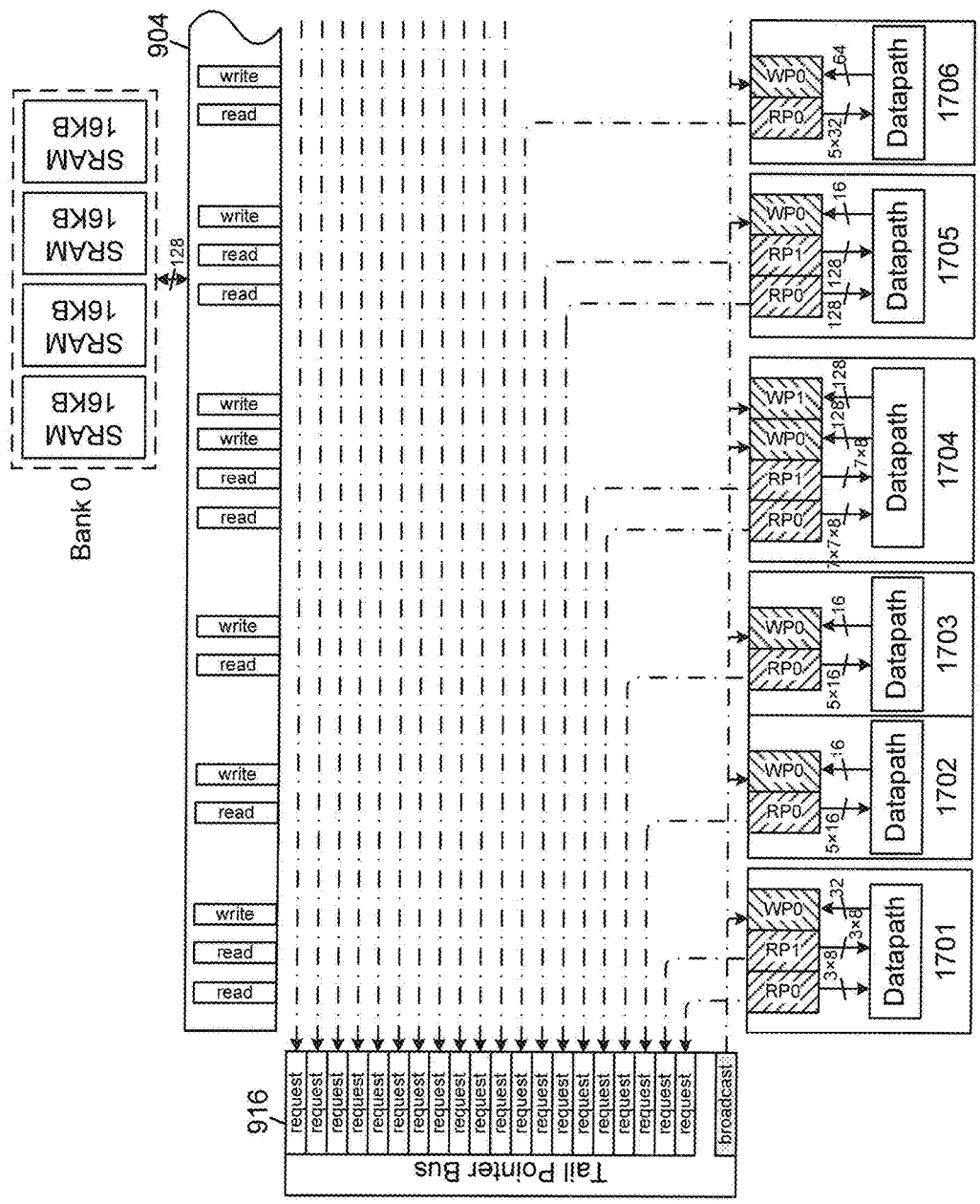
Figure 17H:
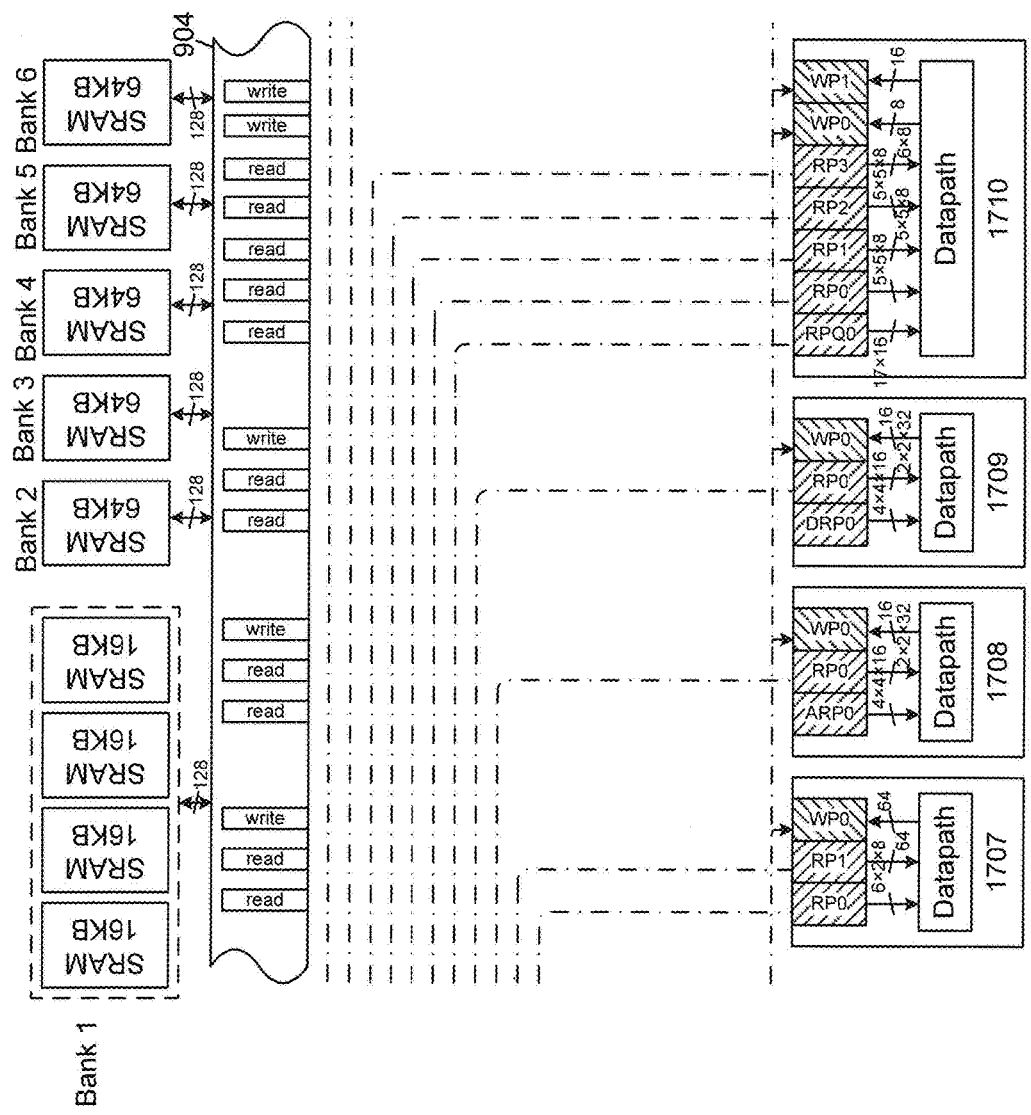
Figure 17I:
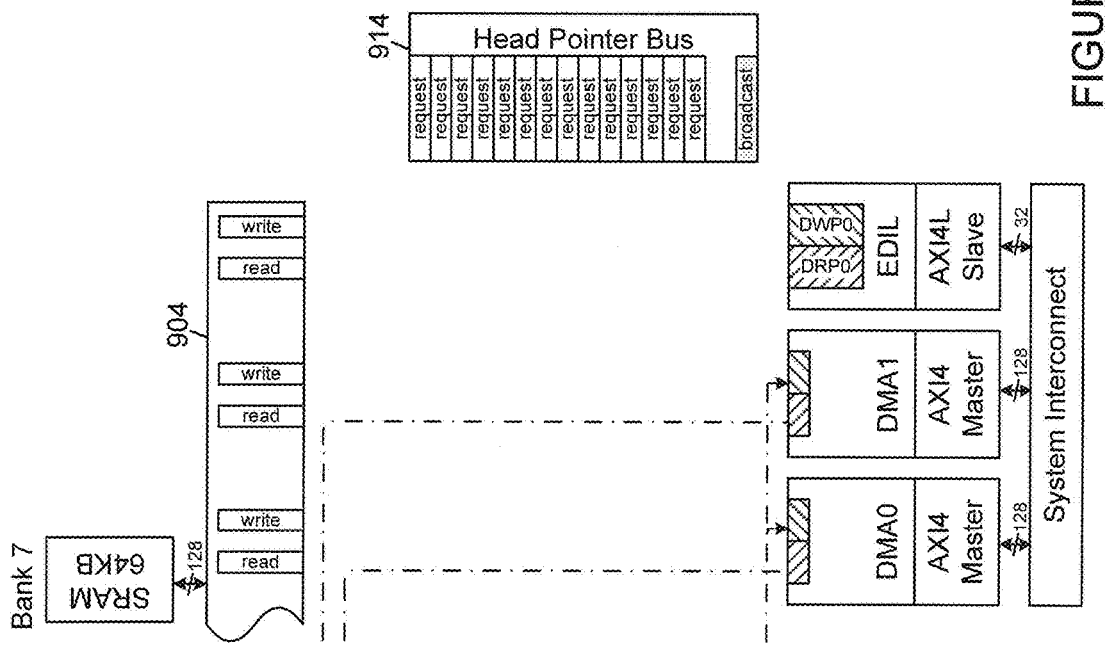

FIGS. 17A through 17I each depict (as solid, directional or bidirectional lines) the data connections between the SXB 904 and the SRAM memory banks, within each hardware accelerator between the buffer read clients or buffer write clients and an internal datapath for the respective hardware accelerator, and between the AXI4 master/AXI4L slave interfaces and the system interconnect. FIG. 17A through 17C each further depict (as dashed, directional lines) memory-mapped data interface connections of buffer write clients and buffer read clients in the hardware accelerators with dedicated write or read connections in the SXB 904. FIG. 17D through 17F each further depict (as dotted, directional lines) data connections between the hardware accelerators and the head pointer bus 914. Each buffer write client within the hardware accelerators is connected to a different request input for the head pointer bus 914. All buffer read clients within the hardware accelerators are connected to the same broadcast output of the head pointer bus 914. FIG. 17G through 17I each depict (as dash-dotted, directional lines) data connections between the hardware accelerators and the tail pointer bus 916. All buffer write clients within the hardware accelerators are connected to the same broadcast output of the tail pointer bus 916. Each buffer read client within the hardware accelerators is connected to a different request input for the tail pointer bus 916.

As discussed above, the memory space formed by the eight banks of SRAM is allocated to the hardware accelerators on a use case basis to individual ones of the hardware accelerators 1701-1710. Whenever the respective one of the hardware accelerators 1701-1710 operates by raster reads and writes for the operation(s) performed in the use case implemented, the allocated memory space is configured in the form a circular buffer; when necessary, however, the allocated memory space may be configured as a tile buffer. Because some imaging operations require multiple portions of the image data, the corresponding hardware accelerator 1701, 1704, 1705, and 1707-1710 includes multiple read ports. Likewise, hardware accelerators 1704 and 1710 each include multiple write ports to allow concurrent writing of different results of operating on the image data.

Figure 18:
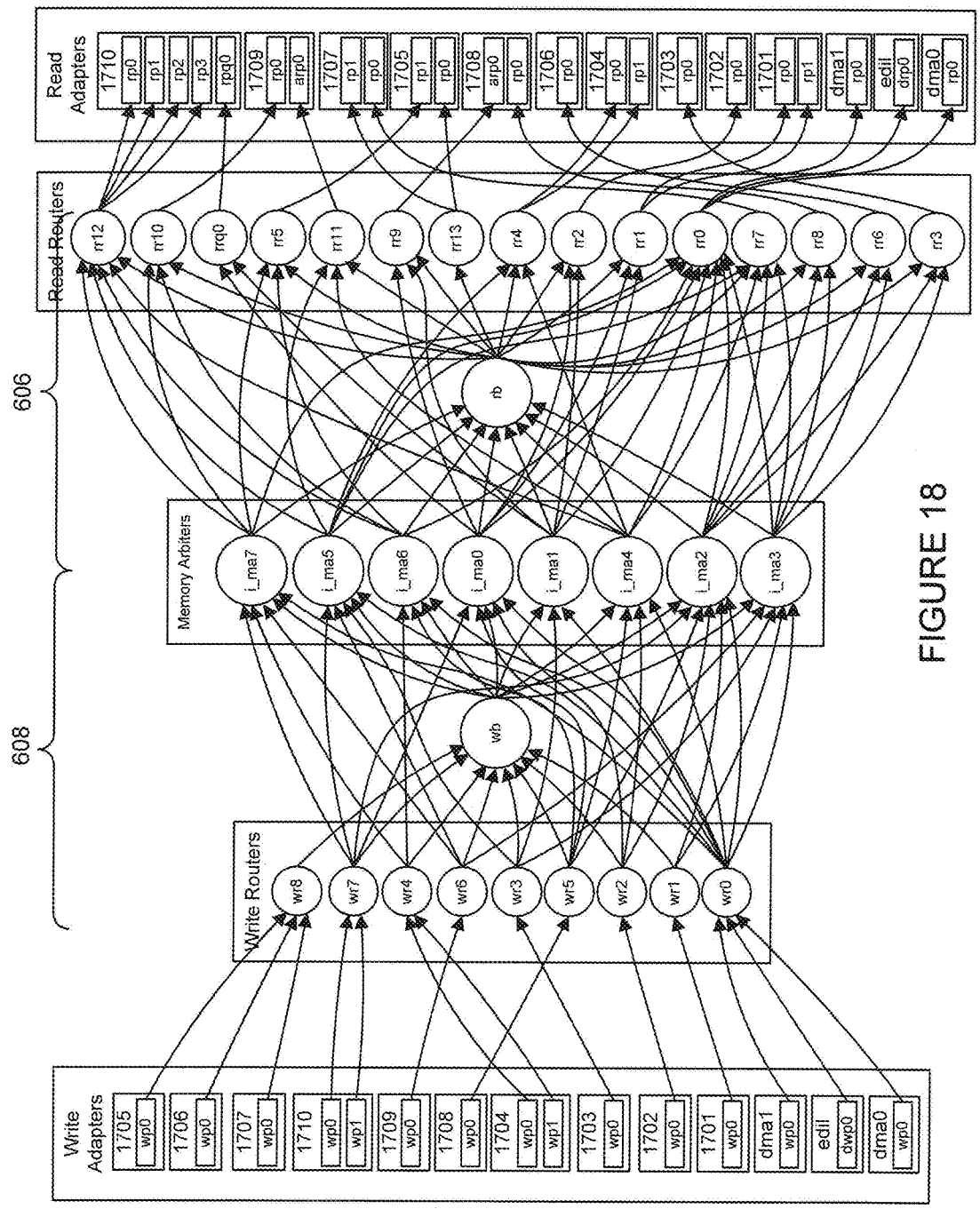
FIG. 18 illustrates the operation of a sparse crossbar and memory subsystem for a vision Chaining Fabric (vCF) within the hardware architecture for acceleration of computer vision and imaging processing in accordance with an embodiment of the present disclosure.

FIG. 18 illustrates the operation of a sparse crossbar and memory subsystem for a vision Chaining Fabric (vCF) within the hardware architecture for acceleration of computer vision and imaging processing in accordance with an embodiment of the present disclosure. FIG. 18 corresponds to the embodiment of FIGS. 17A through 17I. On the left of FIG. 18, write adapters for various hardware accelerators and data transfer interfaces are depicted (from top to bottom): write adapter wp0 for hardware accelerator 1705; write adapter wp0 for hardware accelerator 1706; write adapter wp0 for hardware accelerator 1707; write adapters wp0 and wp1 for hardware accelerator 1710; write adapter wp0 for hardware accelerator 1709; write adapter wp0 for hardware accelerator 1708; write adapters wp0 and wp1 for hardware accelerator 1704; write adapter wp0 for hardware accelerator 1703; write adapter wp0 for hardware accelerator 1702; write adapter wp0 for hardware accelerator 1701; write adapter wp0 for data interface DMA1; write adapter wp0 for data interface EDIL; and write adapter wp0 for data interface DMA0. The write adapters direct data write requests to one of eight write routers (from top to bottom) wr8, wr7, wr4, wr6, wr3, wr5, wr2, wr1 and wr0: write adapters wp0 for hardware accelerator 1705, 1706 and 1707 to write router wr8; write adapters wp0 and wp1 for hardware accelerator 1710 to write router wr7; write adapter wp0 for hardware accelerator 1709 to write router wr6; write adapter wp0 for hardware accelerator 1708 to write router wr5; write adapters wp0 and wp1 for hardware accelerator 1704 to write router wr4; write adapter wp0 for hardware accelerator 1703 to write adapter wr3; write adapter wp0 for hardware accelerator 1702 to write adapter wr2; write adapter wp0 for hardware accelerator 1701 to write router wr1; and write adapters wp0 for data interfaces DMA1, EDIL and DMA0 to write router wr0.

Write routers wr0 through wr8 may each direct the data write request to one of eight memory arbiters (from top to bottom) i_ma7, i_ma5, i_ma6, i_ma0, i_ma1, i_ma4, i_ma2 and i_ma3, or to a write bus wb if a direct connection from a write router to an intended memory arbiter does not exist. From the write bus wb, the data write request may be directed to one of the eight memory arbiters. In the example shown, data write requests from write router wr8 are always directed to write bus wb, and data write requests from write router wr0 are never directed to write bus wb. Write routers wr0 through wr7 may each transmit data write requests to selected memory arbiters: write router wr7 may direct data write requests to any of memory arbiters i_ma7, i_ma5, i_ma0, or i_ma2; write router wr4 may direct data write requests to either of memory arbiters i_ma7 or i_ma6; write router wr6 may direct data write requests to any of memory arbiters i_ma7, i_ma5, i_ma1, or i_ma3; write router wr3 may direct data write requests to any of memory arbiters i_ma5, i_ma1, or i_ma3; write router wr5 may direct data write requests to any of memory arbiters i_ma6, i_ma0, i_ma4, or i_ma2; write router wr2 may direct data write requests to any of memory arbiters i_ma0, i_ma4, or i_ma2; write router wr1 may direct data write requests to either of memory arbiters i_ma2 or i_ma3; and write router wr0 may direct data write requests to any of memory arbiters i_ma7, i_ma5, i_ma6, i_ma0, i_ma1, i_ma4, i_ma2, or i_ma3.

On the right of FIG. 18, read adapters for various hardware accelerators and data transfer interfaces are depicted (from top to bottom): read adapters rp0, rp1, rp2, rp3, and rpq0 for hardware accelerator 1710; read adapters rp0 and arp0 for hardware accelerators 1709; read adapters rp1 and rp0 for hardware accelerator 1707; read adapters rp1 and rp0 for hardware accelerator 1705; read adapters arp0 and rp0 for hardware accelerator 1708; read adapter rp0 for hardware accelerator 1706; read adapters rp0 and rp1 for hardware accelerator 1704; read adapter rp0 for hardware accelerator 1703; read adapter rp0 for hardware accelerator 1702; read adapters rp0 and rp1 for hardware accelerator 1701; read adapter rp0 for data interface DMA1; read adapter rp0 for data interface EDIL; and read adapter rp0 for data interface DMA0.

The read adapters receive data for read requests to one of fifteen read routers (from top to bottom) rr12, rr10, rrq0, rr5, rr11, rr9, rr13, rr4, rr2, rr1, rr0, rr7, rr8, rr6, and rr3: read adapters rp0, rp1, rp2, and rp3 for hardware accelerator 1710 from read router rr12; read adapter rpq0 for hardware accelerator 1710 from read router rrq0; read adapter rp0 for hardware accelerator 1709 from read router rr10; read adapter arp0 for hardware accelerator 1709 from read router rr11; read adapter rp1 for hardware accelerator 1707 from read router rr13; read adapter rp0 for hardware accelerator 1707 from read router rr7; read adapter rp1 for hardware accelerator 1705 from read router rr5; read adapter rp0 for hardware accelerator 1705 from read router rr13; read adapter arp0 for hardware accelerator 1708 from read router rr9; read adapter rp0 for hardware accelerator 1708 from read router rr8; read adapter rp0 for hardware accelerator 1706 from read router rr6; read adapters rp0 and rp1 for hardware accelerator 1704 from read router rr4; read adapter rp0 for hardware accelerator 1703 from read router rr3; read adapter rp0 for hardware accelerator 1702 from read router rr2; read adapters rp0 and rp1 for hardware accelerator 1701 from read router rr1; and read adapters rp0, drp0, and rp0 for hardware accelerators DMA1, EDIL, and DMA0, respectively, from read router rr0.

The read routers may each receive data for a read request from one of the eight memory arbiters, or a read bus rb if a direct connection from a memory arbiter to a read router does not exist. The read bus rb may receive data for read requests from any of the eight memory arbiters. In the example shown, thirteen of the read routers may receive data from the read buffer rb: read routers rr12, rr10, rr5, rr11, rr9, rr13, rr4, rr2, rr1, rr7, rr8, rr6 and rr3. Read routers rrq0 and rr0 never receive data from read bus rb. Read router rr13 only receives data from read bus rb. The remaining read routers may each receive data for read requests from selected memory arbiters: read routers rr12, rr10, rr5, and rr0 from memory arbiter i_ma7; read routers rr12, rr11, rr4, rr0, and rr7 from memory arbiter i_ma5; read routers rr12, rr10, rr5, and rr0 from memory arbiter i_ma6; read routers rrq0, rr9, rr2, rr1, and rr0 from memory arbiter i_ma0; read routers rrq0, rr9, rr2, rr1, and rr0 from memory arbiter i_ma1; read routers rr12, rr11, rr4, rr0, and rr7 from memory arbiter i_ma4; read routers rr0, rr7, rr8, rr6, and rr3 from memory arbiter i_ma2; and read routers rr0, rr7, rr8, rr6, and rr3 from memory arbiter i_ma3. The read bus rb may receive data for read requests from any of the eight memory arbiters.

In the embodiment of a multi-port memory sub-system illustrated in FIGS. 17A through 17I and 18, the word width (128 bits) is determined mainly by maximum bandwidth of an adapter, and the number of SRAM banks is determined mainly by total bisection bandwidth. The write matrix and read matrix indicated in FIG. 18 are designed to satisfy bandwidth and buffer size requirements of each adapter, as well as connectivity requirements of each write adapter/read adapter pair.

Among the features of the architecture described herein are the use of a memory-mapped interconnect from circular buffer write clients and circular buffer read clients to SRAM memory banks. 512 kilobyte (KB) SRAM banks are linearly mapped onto 512 KB memory space with each circular buffer write client and circular buffer read client having full connectivity to each SRAM bank, though the connection may either be a dedicated or shared connection. The architecture provides use-case optimized, sparse dedicated connections, and circular buffers are allocated to SRAMs that have dedicated connections to circular buffer write clients and circular buffer read clients. The architecture described minimizes area and power while providing full connectivity through shared buses for read (RB) and write (WB), with low-bandwidth connections optionally using such buses exclusively. The shared buses may also be used for a limited number of high-bandwidth connections to improve flexibility. Fixed latency access is enabled, with writes occurring immediately when a request is granted and reads also occurring immediately when a request is granted, with actual data arriving after a 3 cycle delay. The vCF described simplifies the design of circular buffer write clients and circular buffer read clients by reducing buffering requirements, and by guaranteeing synchronization with messages from the head pointer bus and the tail pointer bus, which also have fixed latency.

On-the-fly (OTF) interconnects may be used in image signal processors (ISPs) where connections between the various hardware accelerators are known beforehand. For supporting a single, well-known and fixed use case, OTF is likely to be more area/power efficient. The advantage of the vCF of the present disclosure is the ability to support a wide range of both anticipated and unanticipated use cases with minimal overhead. The vCF provides flexible connectivity since connecting hardware accelerators via multi-ported memory makes it efficient to allow high flexibility. Less total on-chip SRAM area is used versus line memories and DMA buffers (conventionally implemented as separate SRAMs), since memory banks are consolidated to a large, multi-ported memory subsystem with memory regions that may be allocated dynamically. Total required SRAM capacity is smaller, since realistic use cases do not require all hardware accelerators to be active at the same time. In addition, having a small number of large SRAMs results in smaller area than having large number of small SRAMs, for the same total capacity.

The stream interconnect described herein consumes less silicon area and power as compared to a purely memory-mapped interconnect with comparable performance and functionality, since flow control messaging is performed using a separate low-overhead interconnect. As compared to a purely point-to-point streaming interconnect, the architecture of the present disclosure allows more flexible connections and flexible access patterns. Line memories and data transfer buffers, traditionally implemented as dedicated SRAMs inside hardware accelerators connected to point-to-point streaming interconnects, are pooled in one large multi-ported memory subsystem. Such pooling potentially reduces the total memory size as compared to a point-to-point streaming interconnect, since the total pool size can be determined based on actual use case(s), rather than as the sum of the worst case requirements of each accelerator.

The multi-port memory subsystem architecture having parallel SRAM banks described above is more area efficient as compared to having a single multi-ported SRAM, since each SRAM bank can have fewer ports than the multi-ported SRsAM, which leads to a smaller area per bit.

The broadcasting buses described involve head pointer messages and tail pointer messages that are "pushed" and not "pulled," so latency is reduced and number of transactions is minimized. A smaller area is required as compared to a memory-mapped interconnect with similar number of masters and slaves. The multi-cast effect is achieved by receivers filtering messages using either a reader ID or a writer ID.

Head pointers/tail pointers that transmit based on programmable trigger parameters, as described above, can reduce power consumption by limiting broadcast frequency. Broadcast frequency can be used to give higher priority to critical streams, so that those streams meet bandwidth requirements.

The programmable reader/writer IDs described means that the ID is associated with a circular buffer data structure (not the physical read/write adapter), allowing flexible use cases.

Multiple reader IDs and associated local tail pointer registers of a write adapter enable the write adapter to track multiple read adapters' tail pointers, and thus support one-to-many streaming use cases.

The programmable local tail pointer registers avoid unnecessary stalling of the write adapter, especially in multi-reader scenarios when a read adapter is activated after a write adapter and/or when the read adapter does not need to read from the beginning of the data stream. Programming the local tail pointer register to an initial value allows the write adapter to assume that the read adapter does not need to read data up to a certain point in the data stream, thus improving performance and/or enabling use cases that might otherwise result in deadlock.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system, comprising:
   a plurality of image processing hardware accelerators each configured to perform a different one of a plurality of image processing operations on image data;
   a multi-port memory shared by the plurality of image processing hardware accelerators and configured to store the image data; and
   an interconnection system configurably coupling the memory as a circular buffer to one or more of the image processing hardware accelerators and configured to process accesses of the image data by the image processing hardware accelerators,
   wherein for a first use case of the image processing hardware accelerators, two or more of the image processing hardware accelerators are configurably chained to operate in sequence in a first order,
   wherein for a second use case of the image processing hardware accelerators, one or more of the image processing hardware accelerators is configurably set to operate alone or chained to operate in sequence in a second order,
   wherein at least one of the image processing hardware accelerators is configurably allocated a portion of the memory based on whether the first use case or the second use case is configured, the allocated portion of the memory configured as part of the circular buffer, and
   wherein the interconnection system comprises:
   a head pointer bus configured to carry a head pointer, which indicates a write progress, for the circular buffer;
   a tail pointer bus configured to carry a tail pointer, which indicates a read progress, for the circular buffer;
   a plurality of circular buffer write adapters configured to convert incoming image data into circular buffer data:
   a plurality of circular buffer read adapters configured to convert circular buffer data into outgoing image data: and
   at least one status bus that synchronizes circular buffer data access within the circular buffer, the at least one status bus communicates between the plurality of circular buffer write adapters and the plurality of circular buffer read adapters.

2. The system according to claim 1, wherein different combinations of the image processing hardware accelerators are configurably chained to operate in sequence in different orders for different use cases for the image processing hardware accelerators.

3. The system according to claim 2, wherein each of the combinations of the image processing hardware accelerators is configurably chained by allocation of portions of the shared memory as buffers between consecutive ones of the image processing hardware accelerators in a corresponding sequence for the respective one of the use cases.

4. The system according to claim 1, wherein the shared memory comprises multiple, concurrently accessible static random access memory (SRAM) banks configured to be allocated in portions to each of the one or more of the image processing hardware accelerators employed in a current use case.

5. The system according to claim 4, wherein portions of at least two of the SRAM banks are allocated as one of an input buffer or an output buffer for each of the image processing hardware accelerators employed in the current use case.

6. The system according to claim 4, wherein the interconnection system is configured to connect a read port for one of the image processing hardware accelerators employed in the current use case to one or more of the SRAM banks for memory allocated to store image data on which the one image processing hardware accelerator is to operate and to connect a write port for the one image processing hardware accelerators to one or more of the SRAM banks for memory allocated to store image data produced by operation of the one image processing hardware accelerator.

7. The system according to claim 1, wherein a portion of the shared memory allocated to at least one of the image processing hardware accelerators employed in a current use case is configured as a tile buffer.

8. The system according to claim 1, wherein the interconnection system is a sparse crossbar.

9. The image processing circuit of claim 1, wherein the multi-port memory subsystem comprises multiple, concurrently accessible static random access memory (SRAM) banks configured to be connected to each of the plurality of circular buffer write adapters and each of the plurality of circular buffer read adapters.

10. The image processing circuit of claim 1, wherein the at least one status bus comprises:
    a write status bus configured to allow one of the circular buffer write adapters to broadcast a write status message to all of the circular buffer read adapters.

11. The image processing circuit of claim 1, wherein the at least one status bus comprises:
    a read status bus configured to allow one of the circular buffer read adapters to broadcast a read status message to each of the circular buffer read adapters.

12. The image processing circuit of claim 1, wherein each of the circular buffer write adapters comprises:
    a write status transmitter configured to transmit write status updates with a programmable writer identifier at programmable time intervals.

13. The image processing circuit of claim 1, wherein each of the circular buffer write adapters comprises:
    a read status receiver configured to receive read status updates from a read status bus, and, when a reader identifier of a received read status update matches one of multiple programmed reader identifiers, store information for the read status update in a local tail pointer register corresponding to the matched reader identifier.

14. The image processing circuit of claim 1, wherein each of the circular buffer read adapters comprises:
    a read status transmitter configured to transmit read status updates with a programmable reader identifier at programmable time intervals.

15. A method, comprising:
    for a plurality of image processing hardware accelerators each configured to perform a different one of a plurality of image processing operations on image data, flexibly interconnecting the image processing hardware accelerators by
    chaining, for a first use case, two or more of the image processing hardware accelerators to operate in sequence in a first order, and setting, for a second use case, one or more of the image processing hardware accelerators to operate alone or chained to operate in sequence in a second order;

for a multi-port memory shared by the plurality of image processing hardware accelerators and configured to store the image data, configuring a portion of the shared memory allocated to one of the image processing hardware accelerators as a circular buffer based on whether the first use case or the second use case is employed; and configuring an interconnection system coupling the memory to one or more of the image processing hardware accelerators to process accesses of the image data by the image processing hardware accelerators, wherein the interconnection system, comprises:

a head pointer bus configured to carry a head pointer, which indicates write progress, for the circular buffer;

a tail pointer bus configured to carry a tail pointer, which indicates read progress, for the circular buffer;

a plurality of circular buffer write adapters configured to convert incoming image data into circular buffer data;

a plurality of circular buffer read adapters configured to convert circular buffer data into outgoing image data; and at least one status bus that synchronizes circular buffer data access within the circular buffer, the at least one status bus communicates between the plurality of circular buffer write adapters and the plurality of circular buffer read adapters.

16. The method according to claim 15, wherein different combinations of the image processing hardware accelerators are configurably chained to operate in sequence in different orders for different use cases for the image processing hardware accelerators.

17. The method according to claim 16, wherein each of the combinations of the image processing hardware accelerators is configurably chained by allocation of portions of the shared memory as buffers between consecutive ones of the image processing hardware accelerators in a corresponding sequence for the respective one of the use cases.

18. The method according to claim 16, wherein the shared memory comprises multiple, concurrently accessible static random access memory (SRAM) banks configured to be allocated in portions to each of the one or more of the image processing hardware accelerators employed in a current use case.

19. The method according to claim 18, wherein portions of at least two of the SRAM banks are allocated as one of an input buffer or an output buffer for each of the image processing hardware accelerators employed in the current use case.

20. The method according to claim 18, wherein the interconnection system is configured to connect a read port for one of the image processing hardware accelerators employed in the current use case to one or more of the SRAM banks for memory allocated to store image data on which the one image processing hardware accelerator is to operate and to connect a write port for the one image processing hardware accelerators to one or more of the SRAM banks for memory allocated to store image data produced by operation of the one image processing hardware accelerator.

21. The method according to claim 15, wherein a portion of the shared memory allocated to at least one of the image processing hardware accelerators employed in a current use case is configured as a tile buffer.

22. The method according to claim 15, wherein the interconnection system is a sparse crossbar.

* * * * *